US005612602A

United States Patent [19]
Kubota et al.

[11] Patent Number: 5,612,602
[45] Date of Patent: Mar. 18, 1997

[54] DEVICE AND METHOD COMPRISING A MOTOR AND/OR A DIGITAL SIGNAL PROCESSOR, MEANS FOR SUPPLYING SIGNALS OF A PLURALITY OF CHANNELS IN SERIAL FORM, OR MEANS FOR CAUSING AN ACTUATOR TO ABUT AN OBJECT

[75] Inventors: Yoichi Kubota; Naoki Kawamata, both of Yokohama; Masahiro Morisada, Tokyo; Katsuhiro Fujii, Ebina; Hiroshi Itoh, Fuchu; Hiroaki Takeishi, Yokohama, all of Japan

[73] Assignee: Canon Kabushiki Kaisha, Tokyo, Japan

[21] Appl. No.: 176,511

[22] Filed: Jan. 3, 1994

Related U.S. Application Data

[63] Continuation of Ser. No. 774,253, Oct. 10, 1991, abandoned.

[30] Foreign Application Priority Data

| Oct. 11, 1990 | [JP] | Japan | 2-270570 |
| Dec. 12, 1990 | [JP] | Japan | 2-401565 |
| Dec. 12, 1990 | [JP] | Japan | 2-401567 |
| Dec. 12, 1990 | [JP] | Japan | 2-401570 |

[51] Int. Cl.⁶ ..................................... G11B 5/55
[52] U.S. Cl. ........................ 318/560; 360/78.12
[58] Field of Search .................. 318/254, 9, 10, 318/14, 560, 561, 601–605; 360/75, 77.01–77.11; 369/44.11, 44.14–44.31

[56] References Cited

U.S. PATENT DOCUMENTS

| 3,656,377 | 4/1972 | Kosem | 318/39 |
| 4,038,590 | 7/1977 | Knowlton | 318/562 |
| 4,356,437 | 10/1982 | Saito et al. | 318/254 |
| 4,642,709 | 2/1987 | Vinal | 360/77 |
| 4,669,004 | 5/1987 | Moon et al. | 360/77 |
| 4,710,834 | 12/1987 | Brand et al. | 360/105 |
| 4,764,831 | 8/1988 | Patel | 360/105 |
| 4,831,470 | 5/1989 | Brunnett et al. | 360/75 |
| 4,878,002 | 10/1989 | Heatzig et al. | |
| 4,881,139 | 11/1989 | Hazebrouck | 360/105 |
| 4,881,161 | 11/1989 | Thompson | 364/167.01 |
| 4,912,476 | 3/1990 | Miller et al. | |
| 4,920,462 | 4/1990 | Couse et al. | 360/78.04 |
| 4,922,513 | 5/1990 | Joichi | 318/254 X |
| 4,931,712 | 6/1990 | DiGiolio et al. | 318/625 |
| 4,962,976 | 10/1990 | Takahashi et al. | |
| 4,972,186 | 11/1990 | Morris | 340/870.25 |
| 5,003,422 | 3/1991 | Sun et al. | 360/105 |
| 5,021,650 | 6/1991 | Rieder et al. | |
| 5,025,335 | 6/1991 | Stefansky | 360/97.01 |
| 5,034,837 | 7/1991 | Schmitz | 360/105 |

FOREIGN PATENT DOCUMENTS

| 0361381 | 4/1990 | European Pat. Off. . |
| 0361786 | 4/1990 | European Pat. Off. . |
| 0390770 | 10/1990 | European Pat. Off. . |
| 0479136 | 4/1992 | European Pat. Off. . |
| 2150397 | 3/1973 | Germany . |

OTHER PUBLICATIONS

Elektronik, vol. 39, No. 16, pp. 71–75, E. Hopper, Aug. 3, 1990.

*Primary Examiner*—Brian Sircus
*Attorney, Agent, or Firm*—Fitzpatrick, Cella, Harper & Scinto

[57] ABSTRACT

A positioning device and method includes a motor having a rotation axis, a driver for driving the motor on the basis of control information, a detector for detecting position information of the rotation axis of the motor, and a digital signal processor for performing an operation on the control information in accordance with the position information detected by the detector.

6 Claims, 23 Drawing Sheets

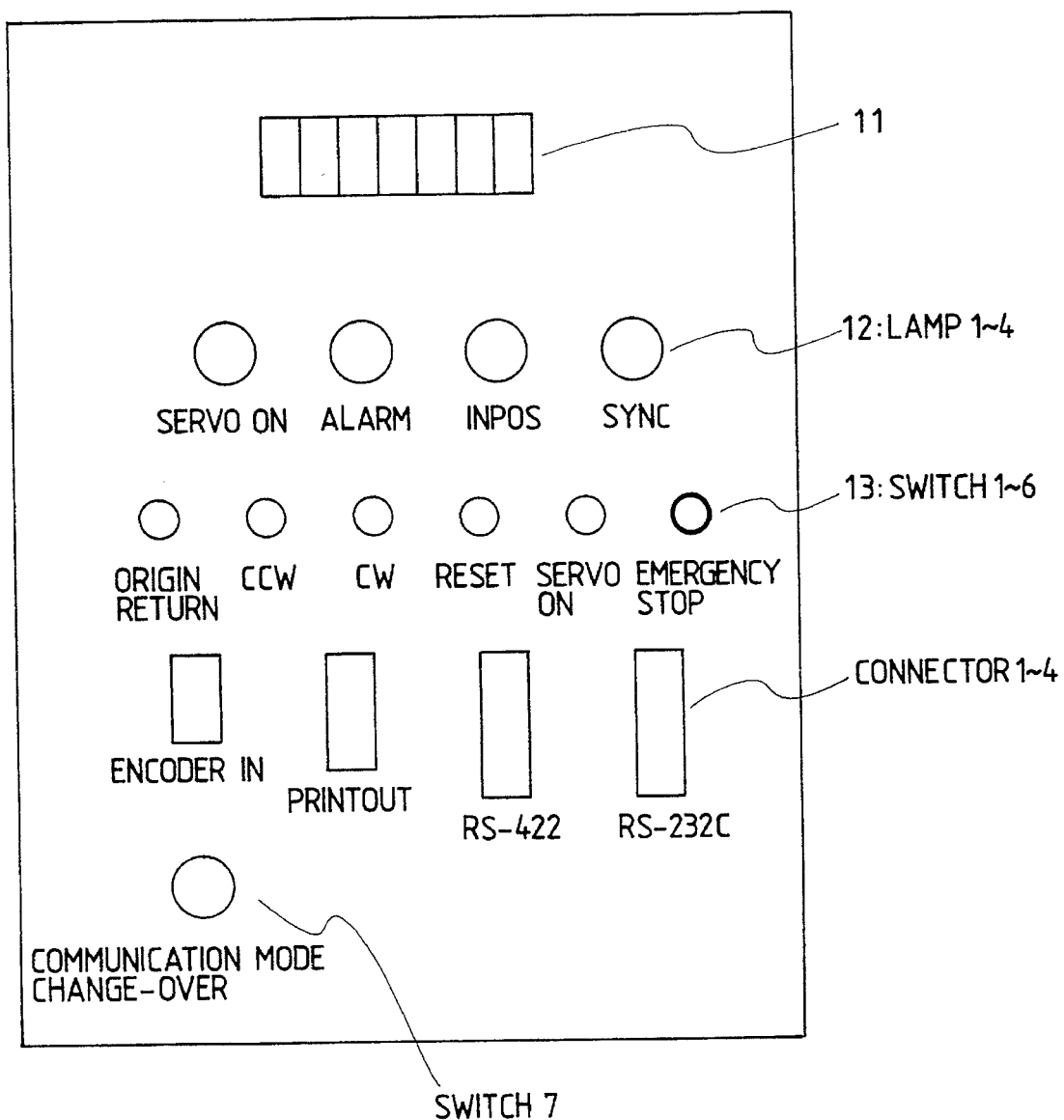

DEVICE AND METHOD COMPRISING A MOTOR AND/OR A DIGITAL SIGNAL PROCESSOR, MEANS FOR SUPPLYING SIGNALS OF A PLURALITY OF CHANNELS IN SERIAL FORM, OR MEANS FOR CAUSING AN ACTUATOR TO ABUT AN OBJECT

This application is a continuation of application Ser. No. 07/774,253 filed Oct. 10, 1991, now abandoned.

BACKGROUND OF THE INVENTION

1. Field of the Invention

The present invention relates to a micro positioning device, and more particularly to a micro positioning device of a writing head drive system in a servo rack writer for writing on a track for a hard disk drive unit.

2. Related Background Art

A conventional hard disk drive unit writes on a servo track by using a DC motor for driving a read/ write head for a hard disk drive unit itself, because the storage capacity is not relatively very large. However, since the servo track pitch serves as a reference for recording or reproducing the information, it must be made less than a read/write pitch for the hard disk drive unit. However, at the resulting higher density, there is a tendency that it is difficult to operate the head disk drive unit when it is internally provided from the viewpoint of positioning accuracy. As a result, a special-purpose servo track writer for writing the track during the manufacture thereof is necessary.

When a special-purpose servo track writer is used, a method is generally adopted in which the head which is internally provided, is driven by means of an external drive unit, with an actuator for operating the head pressed against a support member of the head. Such a conventional example is shown in FIG. 4. In the same figure, 1 is an encoder motor, of which 1A is an encoder portion and 1B is a motor portion. 2 is a drive disk to be driven by the encoder motor 1, and 3 is a drive pin. 4 is a hard disk drive unit. In a factory, such drive units 4 are conveyed in sequence on a belt conveyor (not shown) to the servo track writer 1-3. 5 is a hard disk within the drive unit 4, 6 is a head arm, and 7 is a linear motor. The track data is written onto the hard disk 5 by means of a head 8 installed at a leading end of the head arm 6, with the drive pin 3 abutting against the head arm 6, while moving the head arm 6 circularly around a fulcrum 10 with the encoder motor 1. The track data is transmitted from a data transmission device 11 located outside of the above members to the head 8. Here, the servo track writer is constituted of the above members 1 to 11, and the hard disk 5 and the linear motor become a hard disk as the product.

In this way, in recent years, the servo track writer with the constitution as shown in FIG. 4 has been used along with the higher density servo track, whereas the hard disk drive unit 4 of FIG. 4 is conveyed on a manufacturing line but not fixed at any time. Accordingly, in such a device that temporarily connects, so to speak, the moving member and the stationary member such as the servo track writer 1-3 as shown and performs the positioning operation with a high precision, there was a significant problem to be solved that the high precision in writing the servo track was difficult to maintain stably, due to the instability of the connection, if the connecting portion was badly secured.

Conventionally, in a device using a plurality of D/A converters, when the D/A converters of n-bit parallel data input were used, n data signal lines for each D/A converter were used. Also, when D/A converters of serial data input were used, the serial data signal line was prepared one for each D/A converter, the read timing of which was determined with its control signal.

Conventionally, in a device using a plurality of D/A converters, data was separately input into respective D/A converters. Accordingly, for D/A converters of parallel input, (number of bits) x (number of D/A converters) of data input lines are necessary. Also, for D/A converters of serial input, data input lines as many as the number of D/A converters are necessary, resulting in the occupying a large area on a substrate. Also, in practical use, there are many cases where a board on which the D/A converters are mounted and a board on which data are created for input into the D/A converters are separated from each other, requiring a number of long signal conductors, and thereby running the risk of disconnection of the conductors or noise.

Also, conventionally, a precision micro positioning device is often used in a laser interferometer, and in which are arranged a plurality of expensive optical devices, scanning the laser beam with a gas laser.

The laser interferometer method as above mentioned was required to have a large space for the arrangement, because there are disposed a gas laser oscillator, an interferometer, optical devices such as a corner cube, and instruments, over which the laser beam scans. Furthermore, because of the interferometer used, there are some changes in the characteristics due to the temperature variation or fluctuation of air flow, so that it is necessary to be used in a clean room. Owing to the above-described large restriction, that is, the restriction on the space and service environment, the laser interferometer method is consequently very costly.

Also, conventional positioning devices generally use a PWM type driver for driving the motor in order to increase the power efficiency. In a circuit for controlling the motor, an analog loop control circuit is used for real time processing.

However, in the above example, there are the following drawbacks in positioning with high precision.

As the motor driver is used with the PWM method, (1) high frequency noise is produced as a result of the switching operation, destroying the linearity in a minute area, so that it is difficult to obtain an excellent controllability.

Also, as the control circuit is an analog loop control circuit, (2) there is a limitation in positioning with high precision because the characteristics (precision, noise, temperature) of the elements used may have direct effects on the system characteristics.

The fine adjustment of the characteristics requires great skill, and takes several processes, and (3) the change of elements for use over time has an immediate effect on the system characteristics, shortening the life of the system.

(4) the analog loop control circuit does not allow the implementation of a complex algorithm necessary in positioning with high precision.

SUMMARY OF THE INVENTION

In view of the above-described respects, it is an object of the invention to provide a micro positioning device which shortens the setting time in positioning by making the positioning operation closer to an ideal form, and allows a more efficient positioning with high precision.

To accomplish the above object, the present invention provides a positioning device characterized by comprising an actuator for performing a micro positioning operation by moving in a direction of a movement subject under the drive control by positioning control means and making contact with the movement subject, detecting means for detecting a movement position of the actuator, and conducting means for causing a magnetic material portion of the actuator to conduct electricity and be temporarily magnetized in accordance with a setting output signal indicating that a detection signal of the detecting means has come within a predetermined range of setting that has been preset, thereby electrically attaching temporarily the temporarily magnetized magnetic material portion with the movement subject so as to increase the load.

It is another object of the present invention to provide a positioning device which can stabley maintain a positioning operation with high precision in a shorter positioning setting time and with a more efficient operation in such a way as to magnetize temporarily a part of the actuator which comes in contact with a magnetic material portion of an object, and integrate an unstable object with a device at a fixed position, as necessary, in order to stabilize an unstable connecting portion and to deal with unstable objects passing on a manufacturing line.

It is an object of the present invention to provide a device having fewer signal conductors by substituting a data signal conductor with one signal conductor for transmission.

It is another object of the present invention to provide a device which allows the number of signal conductors to be reduced by using one line of a data signal conductor in such a way as to serially transmit data for a plurality of channels with one line of data signal conductors and to read the data by switching a control signal (latch signal) for each D/A converter.

It is another object of the present invention to provide a positioning device which allows a positioning actuator having a resolution corresponding to an ideal high precision positioning sensor to be firstly obtained, while eliminating the undesirable effects of the coupling on high precision positioning by mounting a high precision rotary encoder onto a motor shaft.

The present invention provides the positioning device which allows positioning to be performed in a shorter time (if oscillated, the positioning may be troubled and a longer setting time taken) wherein the oscillation effect due to the switching can be reduced by the use of a digital controller mainly of a digital signal processor, and a linear driver rather than a PWM type which may cause noise, as the motor driver.

It is another object of the present invention to provide a high precision, highly functional positioning device by providing a digital signal processor capable of performing a digital operation at a high speed and with high precision, and a motor driver.

According to one object, the present invention which achieves these objectives relates to a positioning device comprising a motor, a driver, detecting means, and a digital signal processor. The motor has a rotation axis and is driven by a polyphase signal. The driver drives the motor on the basis of control information. The detecting means detects position information of the rotation axis of the motor. The digital signal processor performs an operation on the control information of each phase of the motor in accordance with the position information detected by the detection means.

According to another aspect, the present invention relates to an angular positioning device comprising an encoder, a motor driven by a polyphase signal for driving the encoder, a counter for counting the output of the encoder, a digital signal processor, a digital-to-analog converter, and a microprocessor. The digital signal processor operates and controls the rotation amount of the motor in accordance with the output of the counter. The digital-to-analog converter generates a signal controlling the motor by converting digital data output by the digital signal processor into analog data. The microprocessor administers the operation sequence of the digital signal processor and the encoder.

According to another aspect, the present invention relates to a device comprising signal supply means, control signal supply means, a plurality of digital-to-analog converters and control means. The signal supply means supplies signals of a plurality of channels in serial form as serial data. The control signal supply means supplies a control signal for reading data of a corresponding channel from the serial data which contains the signals of the plurality of channels. The control means separates the signals of the plurality of channels from the signal supply means into signals of each of a plurality of channels, in accordance with the control signal from the control signal supply means. The control means also supplies the separated signals to respective ones of the plurality of digital-to-analog converters.

In one embodiment, the device further comprises a motor having a plurality of drive terminals and a clock signal for operating the digital-to-analog converters. In addition, drive means is provided for driving the motor. The drive means receives and amplifies outputs from the digital-to-analog converters and supplies the amplified outputs to respective ones of the plurality of drive terminals.

In another embodiment, a digital signal processor is supplied for receiving a plurality of digital rotation control signals and for performing an operation on the plurality of digital rotation control signals to be supplied to the plurality of drive terminals for the motor on the basis of position information of a rotation axis of the motor. The device further comprises means for supplying the plurality of digital rotation control signals. In addition, a rotary encoder can be provided for determining a rotation angle of the motor, and converting the rotation angle into a digital signal.

According to another aspect, the present invention relates to a positioning device comprising an actuator, abutting means, detecting means, and conducting means. The actuator has a magnetic material portion to be temporarily magnetized by conduction of electricity, and abuts an object. The abutting means causes the actuator to abut the object. The detecting means detects a movement position of the actuator. The conducting means causes the magnetic material portion of the actuator to conduct electricity when the actuator is located within a predetermined range set by the detection of the detecting means to fix the actuator to the object.

According to still another aspect, the present invention relates to a method for positioning a subject comprising moving, detecting, and controlling steps. The moving step moves an actuator having a magnetic material portion to be temporarily magnetized by conduction of electricity so as to abut the subject. The detecting step detects a setting position of the actuator. The controlling step controls a position of the subject by causing the magnetic material portion of the actuator to conduct electricity in accordance with the setting position detected in the detecting step to fix the actuator to the subject.

BRIEF DESCRIPTION OF THE DRAWINGS

FIG. 11 is a view showing a front panel;

DETAILED DESCRIPTION OF THE PREFERRED EMBODIMENTS

The examples of the present invention will be described below in detail with reference to the drawings.

Figure 1:
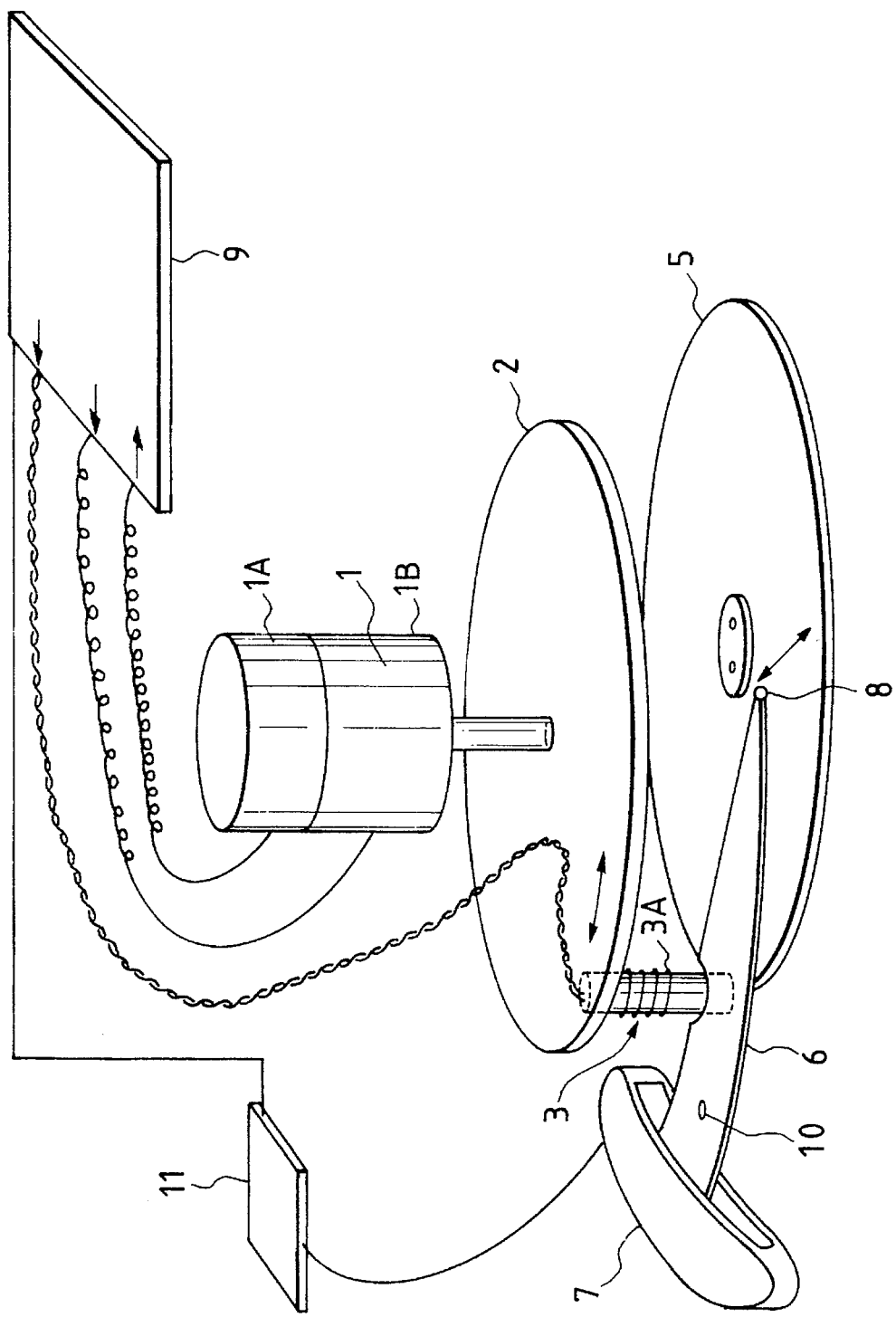
FIG. 1 is a perspective view showing the entire construction of one example of the present invention.
Figure 4:
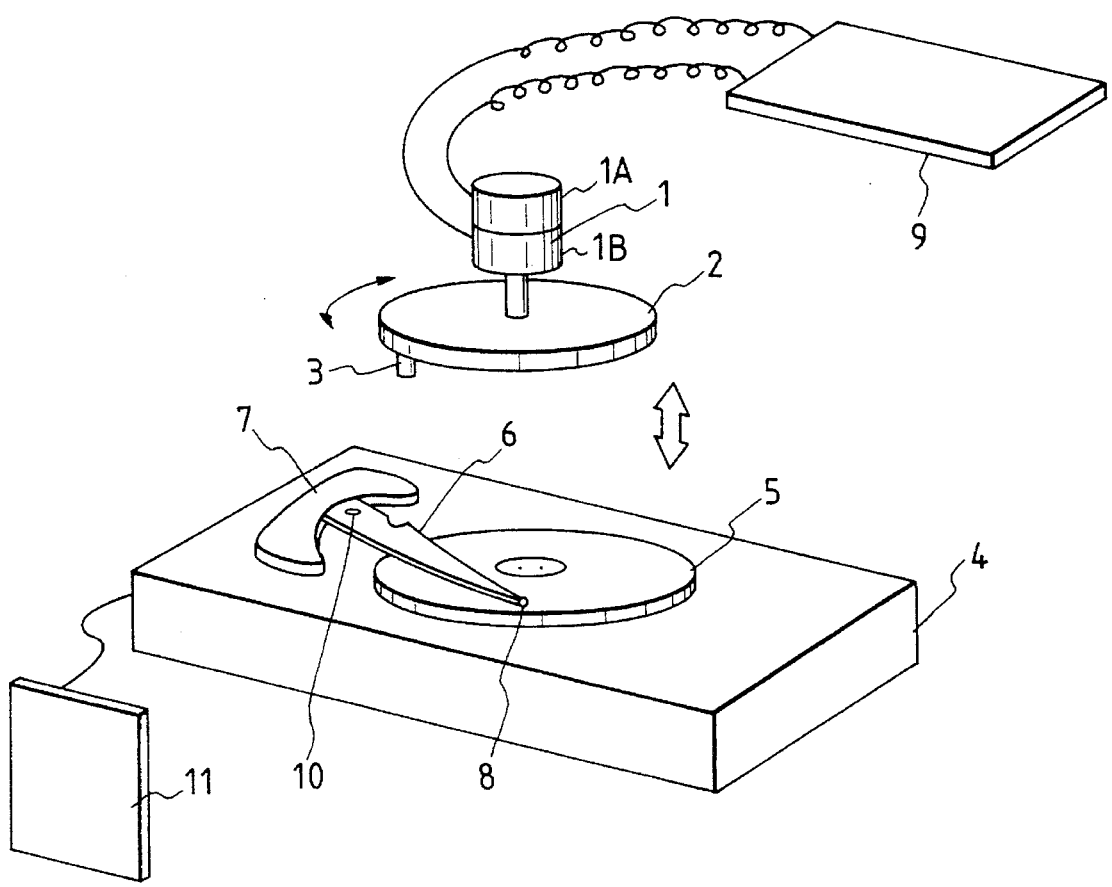
FIG. 4 is a perspective view showing the entire construction of a conventional example.

FIG. 1 shows the entire structure of one example of the present invention. The same parts as in the conventional example shown in FIG. 4 have the same reference numerals, and a detailed explanation thereof will be omitted. As shown in FIG. 1, the mechanical arrangement of this example is the same as in the conventional example of FIG. 4, but an electromagnet is attached to a drive pin 3 which is an actuator, and a controller 9 is provided for controlling the conduction of the current to a coil 3A of the drive pin 3 at a predetermined timing.

A signal indicating the predetermined timing is issued when the position deviation for positioning has fallen within a range between two preset values 1 and 2, and serves as an ON signal and an OFF signal of an electromagnet 3 in FIG. 3 as will be described later, respectively, in which at the timing of the ON signal, conduction is performed. With this conduction, the electromagnet 3 and a magnetic material portion of a head arm 6 are electrically bonded.

Figure 2:
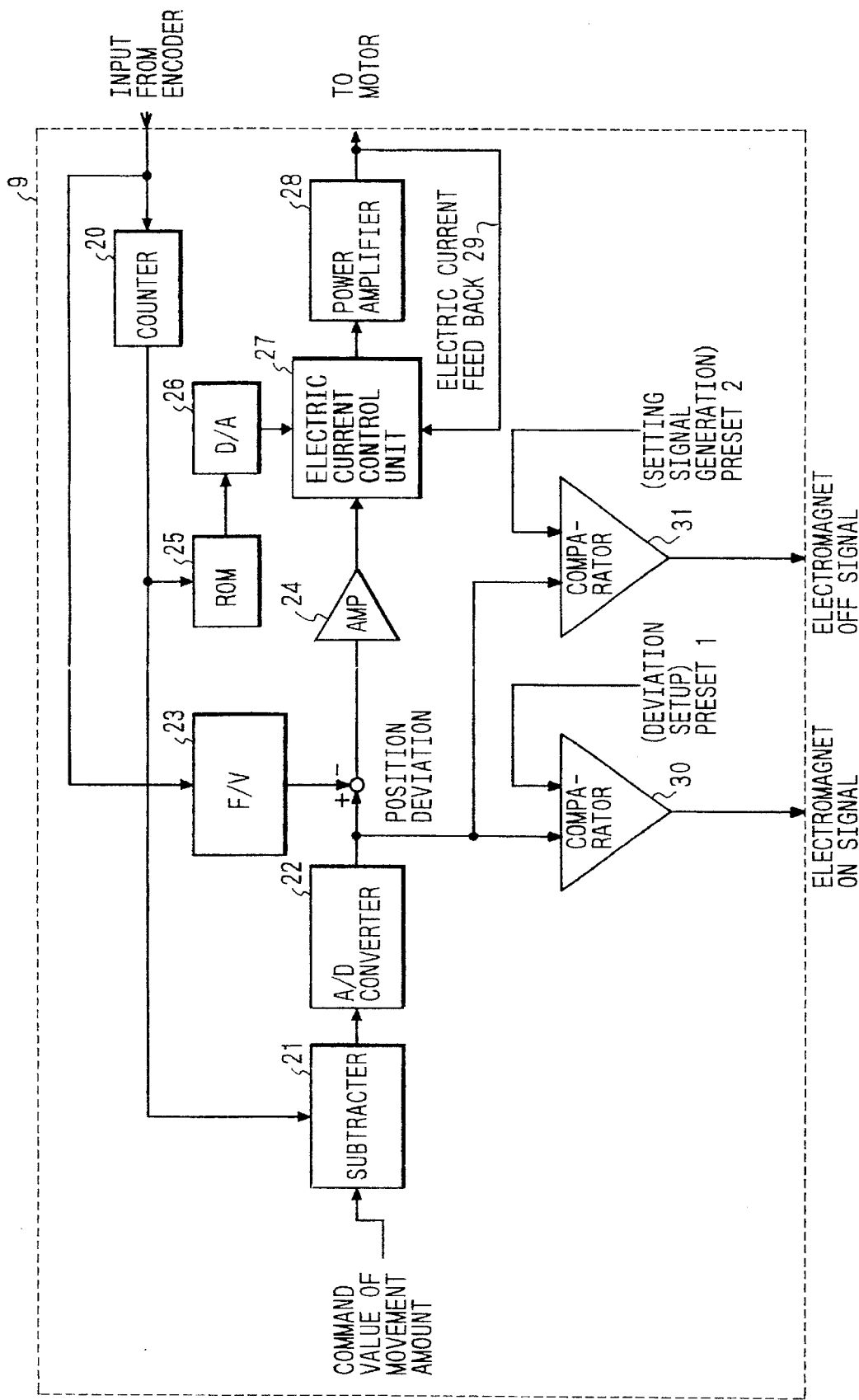
FIG. 2 is a block diagram showing a circuit configuration of a controller of FIG. 1.

FIG. 2 shows a circuit configuration example of the controller 9 in one example of the present invention as shown in FIG. 1. In FIG. 2, it is assumed that the command value of the movement amount for a motor 1B which moves the drive pin 3 has been preset. Also, this command value has the number of pulses in an encoder 1A as the unit. As a shaft of the motor 1B and a shaft of the encoder 1A are integrated like the encoder motor 1, the movement amount of the motor 1B is always input into the controller 9 as the encoder pulse. At this time, the current passing through the motor 1B is controlled by the controller 9 so that the difference between the command value of movement amount as above mentioned and the input value from the encoder 1A, i.e., position deviation, may be zero. That is, the input pulses of the encoder 1A are counted by a counter 20 to be sent to a subtracter 21 as the digital value, and compared and operated with a specified digital value of movement amount in the subtracter 21, in which the difference between them is converted into an analog value in a D/A (digital to analog) converter 22. And this analog value is used as the position deviation as above mentioned.

The movement speed of the motor 1B is converted into the analog value by a F/V (frequency to voltage) converter 23 which inputs the encoder pulse, amplified together with the above position deviation by an amplifier 24, and sent to an electric current control unit 27. Besides that, to the electric current control unit 27, the drive current is applied by a ROM 25 which stores the drive current values corresponding to the positions of the encoder 1A and the D/A converter 26, and further a motor drive current feedback 29 is fed back, in which finally the drive current is passed through a power amplifier 28 at the next stage to the motor 1B.

Figure 3:
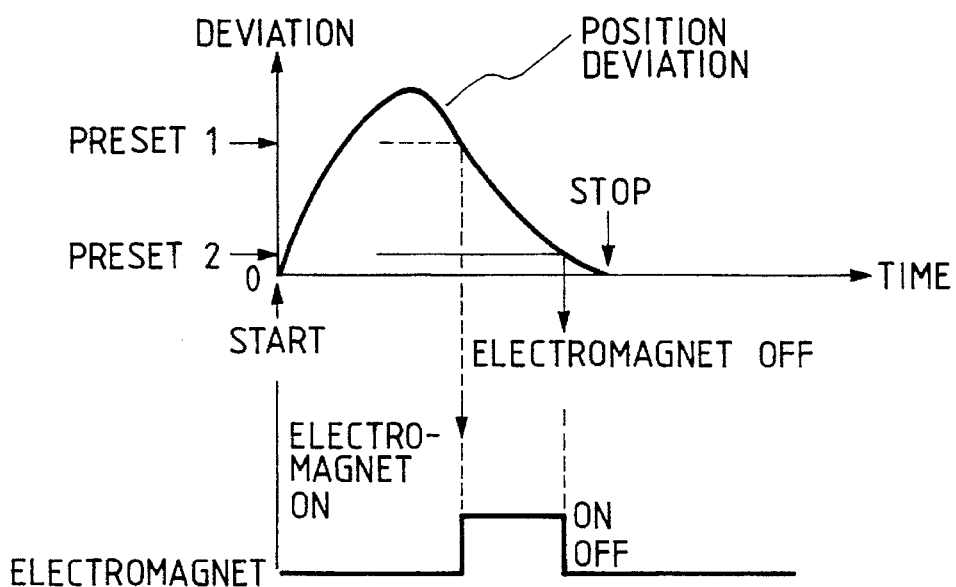
FIG. 3 is a waveform diagram showing an operation pattern of the circuit of FIG. 2.

FIG. 3 shows an operation pattern for positioning and the ON/OFF timing of the electromagnet 3 in the example of the present invention. A pattern is drawn such that after the motor 1B has been started, the position deviation (difference between target and actual positions) increases, and then decreases in approaching closer to a target position. In this example, the deviation of a relatively large value is set as a preset 1 in a first comparator 30 within the controller 9 as shown in FIG. 2, and all values near a position deviation of zero are set as a preset 2 in a second comparator 31, considering that the setting for positioning therein has been almost completed. And when the position deviation is large, the electromagnetic coil 3A is turned ON (conduction) based on the preset 1, so as to integrate the head arm 6 and the drive disk 2 via the drive pin 3. As a result, the load is increased so that the vibration is suppressed to quicken the setting for positioning. After the setting, the electromagnet 3 is turned OFF. Therefore, at the next start, the starting is facilitated because of a light load, whereby the positioning can be performed by repeating such an operation that the electromagnet 3 is turned ON as described above if the deviation is large, and then turned OFF after the setting.

As a second example of the present invention, the back bias can be always applied to a linear motor 7 of FIG. 1, opposed to a movement direction only at the setting for positioning. That is, in this example, the back bias is turned ON in synchronism with the ON timing of the electromagnet 3 to increase the load and quicken the setting, while the back bias is turned OFF in synchronism with the OFF timing of the electromagnet 3 to reduce the load and facilitate the starting.

As a third example of the present invention, the back bias may be also applied slightly even when the electromagnet 3 is OFF, by using the variable back bias amount, though the second example of the present invention is the ON/OFF control of the back bias. And this example is the same as the second example in that when the electromagnet 3 is ON, the bias amount is increased, while when the electromagnet 3 is OFF, the bias amount is decreased. Note that in the second and third examples, the back bias is transmitted from a data transmission device 11 under the control of the controller 9.

As above described, according to the present invention, there is an effect that high precision positioning can be performed in a more efficient way, closer to an ideal form, because positioning is performed in a shorter setting time by positively increasing or decreasing the load in accordance with the positioning operation in such a way as to magnetize temporarily a part of the actuator which comes in contact with a magnetic material portion of an object to integrate a non-stationary object with a device at fixed position.

Next, another example of the present invention will be described with reference to the drawings.

Figure 5:
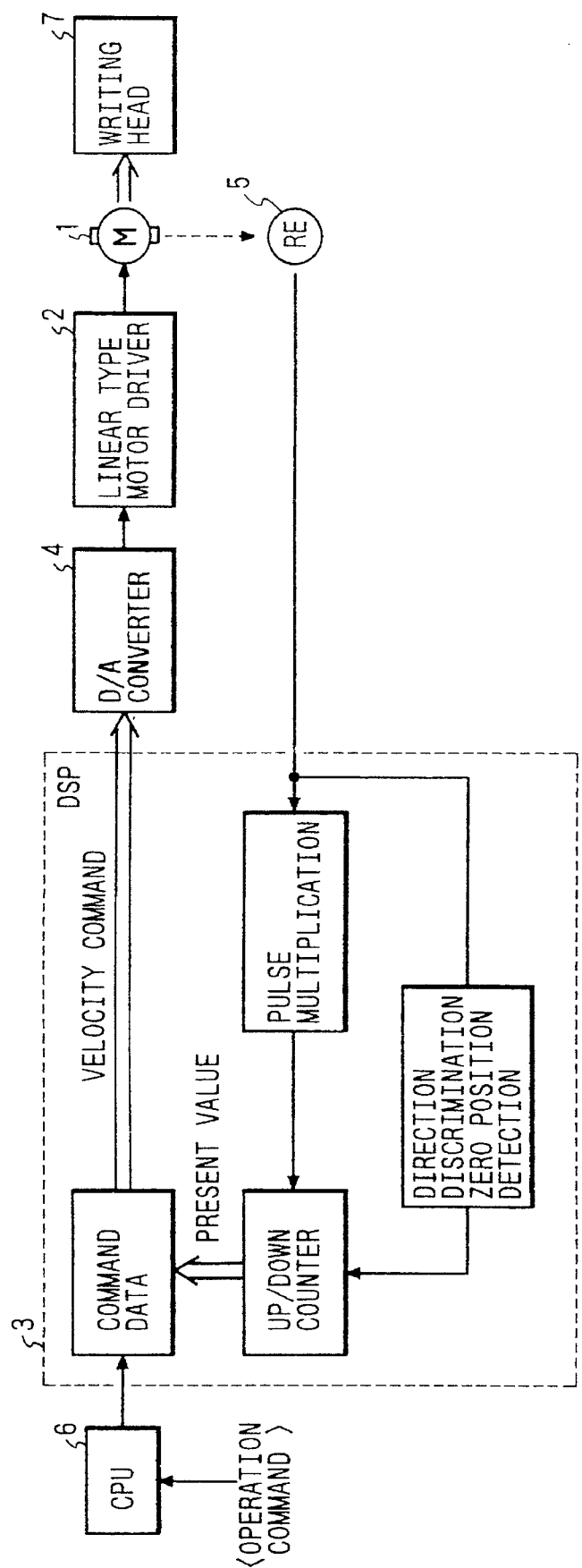
FIG. 5 is a block diagram of an example to which the present invention is applied.
Figure 7:
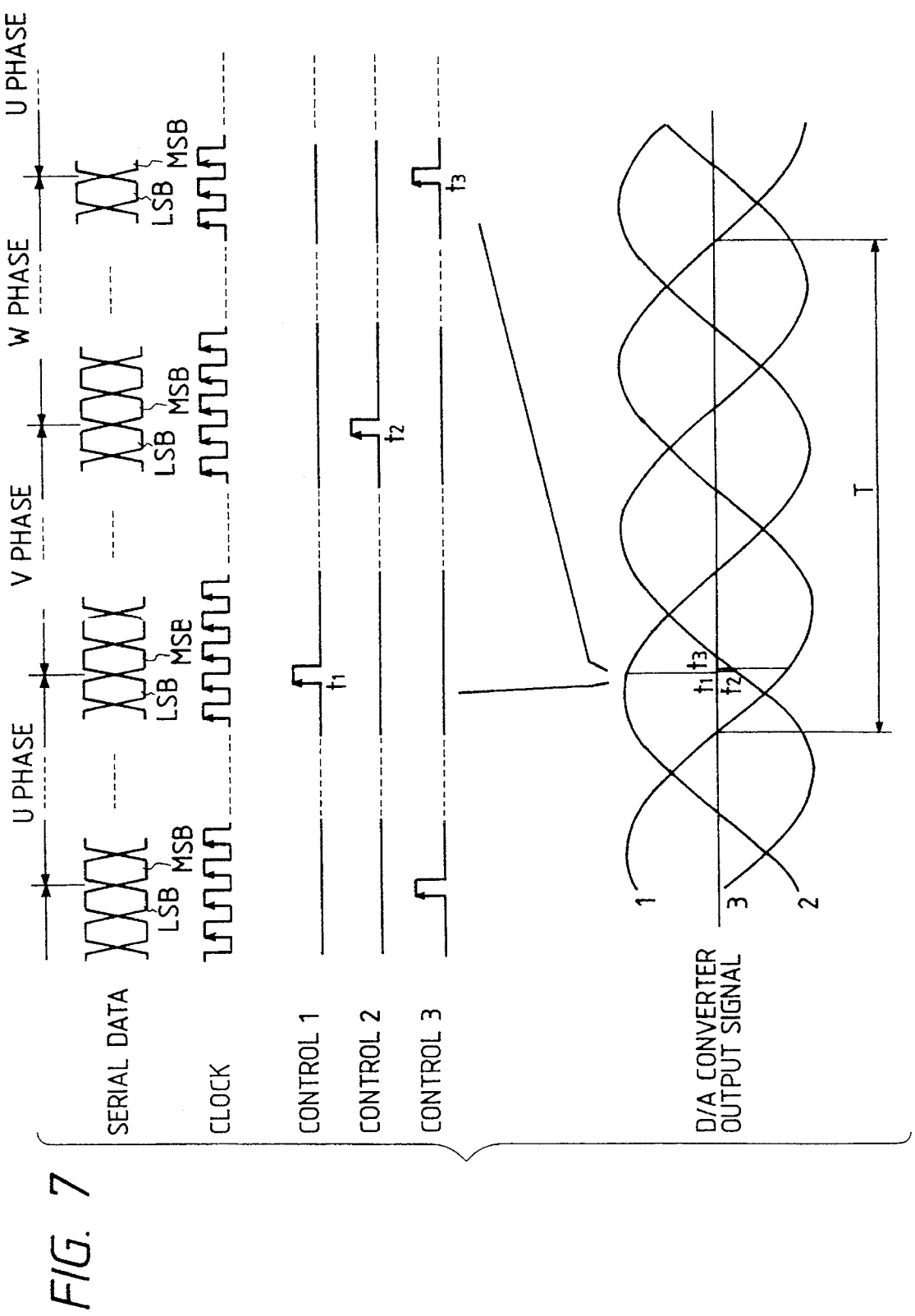
FIG. 7 is a timing diagram.

FIG. 5 is a diagram showing one example in which the present invention is applied to a track writing device of a hard disk. In the same FIG. 7 is a track writing head for a hard disk device. 1 is a brushless motor for driving the head. 2 is a linear type motor driver for driving the brushless motor. 5 is a rotary encoder for detecting the rotation angle of the brushless motor and converting it into the digital signal. 3 is a DSP (digital signal processor controller) for generating a command to be given to the brushless motor, by performing the digital operation of a command input value and the current position and speed data from the rotary encoder in accordance with a preset program. 4 is a D/A converter for converting the digital output signal of the DSP controller 3 into the analog signal for input into the linear type motor driver 2. 6 is a host CPU.

Next, the D/A converter, the driver and the motor as above mentioned will be further described.

Figure 6:
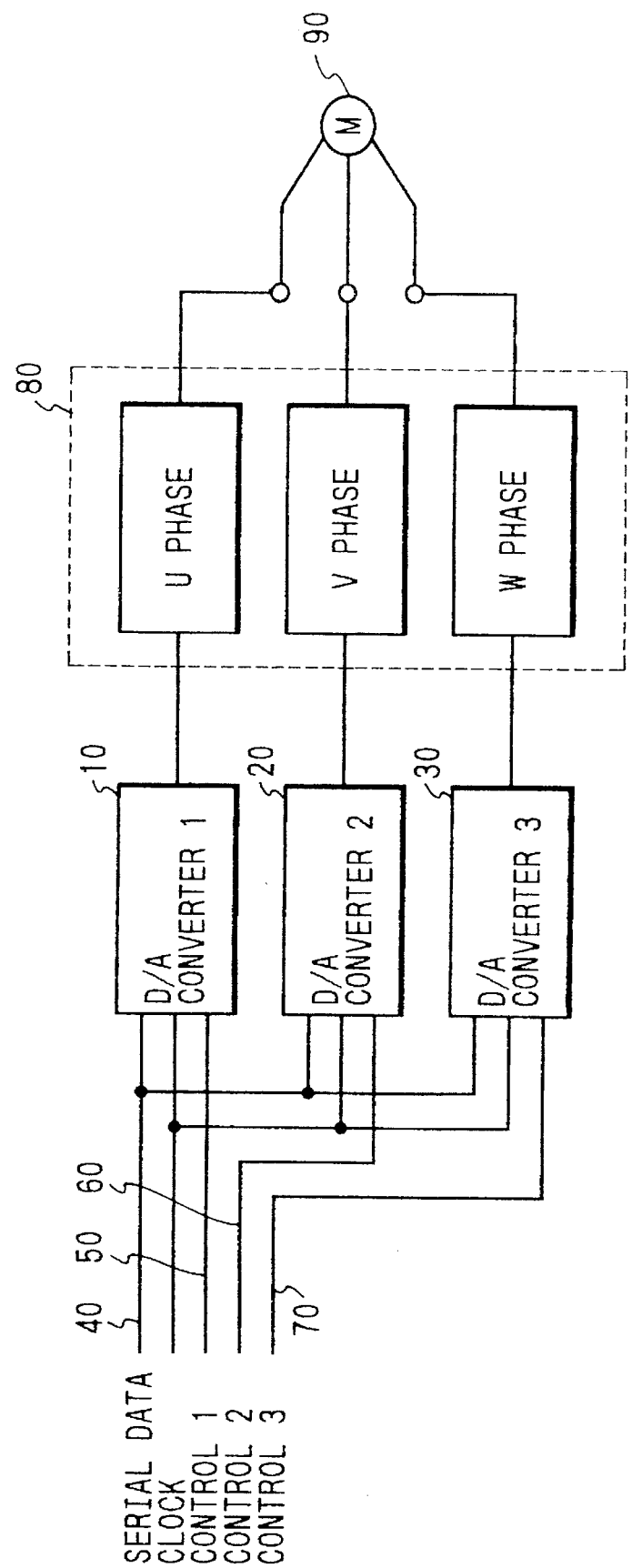
FIG. 6 is a block diagram of a motor driver.

FIG. 6 is an example in which the motor driver 80 for driving a brushless three-phase motor 90 is combined with the D/A converters 10, 20, 30.

To drive the brushless three-phase motor, three phase signals (U phase, V phase, W phase) separated 120 degrees from each other are necessary. Here, a serial data containing three phase data for U, V and W phases is given by using one data signal conductor 40 for three D/A converters, as shown in FIG. 2. The D/A converter for the U phase picks up (latches) data of MSB to LSB at a time t1 with a control 1 signal. Likewise, the D/A converter for the V phase picks up (latches) data of MSB to LSB at a time t2 with a control 2 signal, and the D/A converter for W phase at a time t3 with a control 3 signal. The motor driver 80 amplifies the signals supplied respectively from the D/A converters 10, 20, and 30 and drives the motor 90.

Here, the frequency of the control 1, 2, 3 signals is selected to be sufficiently smaller than a frequency T of three-phase signal to be given to the three phase motor.

If a D/A converter having a 16 bit parallel input is used with the above configuration, 48 lines of the data signal conductor are necessary, while with a D/A converter of having a serial input, three lines having a data signal conductor are necessary if the data signal is individually transmitted. The motor driver is often installed a distance away from a CPU board for creating data to be given to the D/A converter, and the signal conductors are desirably as few as possible, while the signal conductor can be met with one line by adopting the configuration of FIG. 6 and supplying the signal in a way as shown in FIG. 7.

In FIG. 6, one three-phase motor driver is shown, but likewise for a plurality of drivers, one data signal conductor may be also used to transmit the serial data containing data corresponding to the channels to be used. Of course, the driver for not only the three phase motor but also other types of motors can be used.

First, the operation condition for writing the track of hard disk (such as a track pitch) is specified in the host CPU 6, which transmits this specified operation condition to the DSP controller 3.

The DSP controller 3 creates a current position signal of the writing head 7 (a rotor for the brushless motor 1) by counting the digital output signal from an incremental encoder 5, operates uses the difference between that current position and a specified target position as the movement amount, and outputs a speed command corresponding to this movement amount to the D/A converter 4.

Also, to perform the detection and direction discrimination for an origin position of the incremental encoder 5 and a micro positioning of the writing head, the output pulse from the encoder is divided, performing an operation for enhancing the resolution.

Also, by determining the movement amount from the difference between the current position signal and the specified target position signal, a speed command is generated in accordance with a predetermined rule of correspondence.

Figure 8:
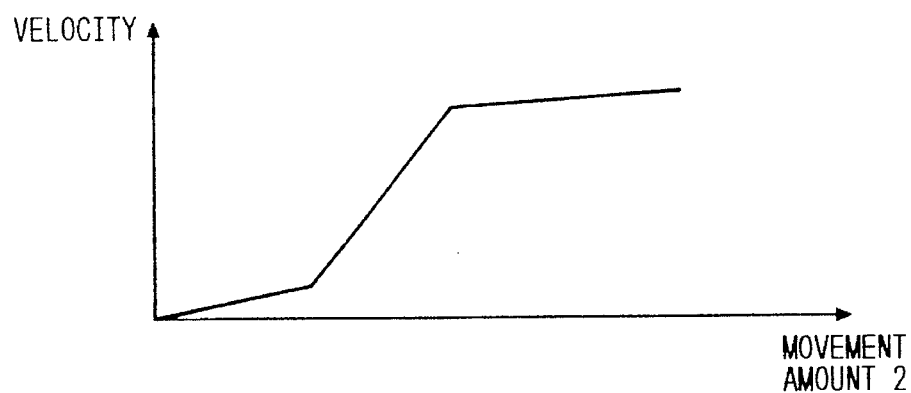
FIG. 8 is a graph showing a nonlinear control.

For example, the movement amount as shown in FIG. 8 non-linearly corresponds to the speed command.

The motor drive signal which is made an analog signal by the D/A converter 4 is amplified in power by the linear type motor driver 2 to drive the brushless motor 1a to allow the writing head 7 to perform a predetermined operation.

Here, since the motor driver 2 is a linear type, the noise is quite small and the linearity in a minute displacement area is maintained, so that highly accurate control is enabled. Also, since the writing head 7 has a high impedance, noise is likely to be generated, whereby the linear type motor driver 2 which causes a small amount of noise is necessary. The brushless motor 1 has excellent controllability, because of the occurrence of electrical and mechanical noises is small owing to no the absence of mechanical sliding portions.

Figure 9:
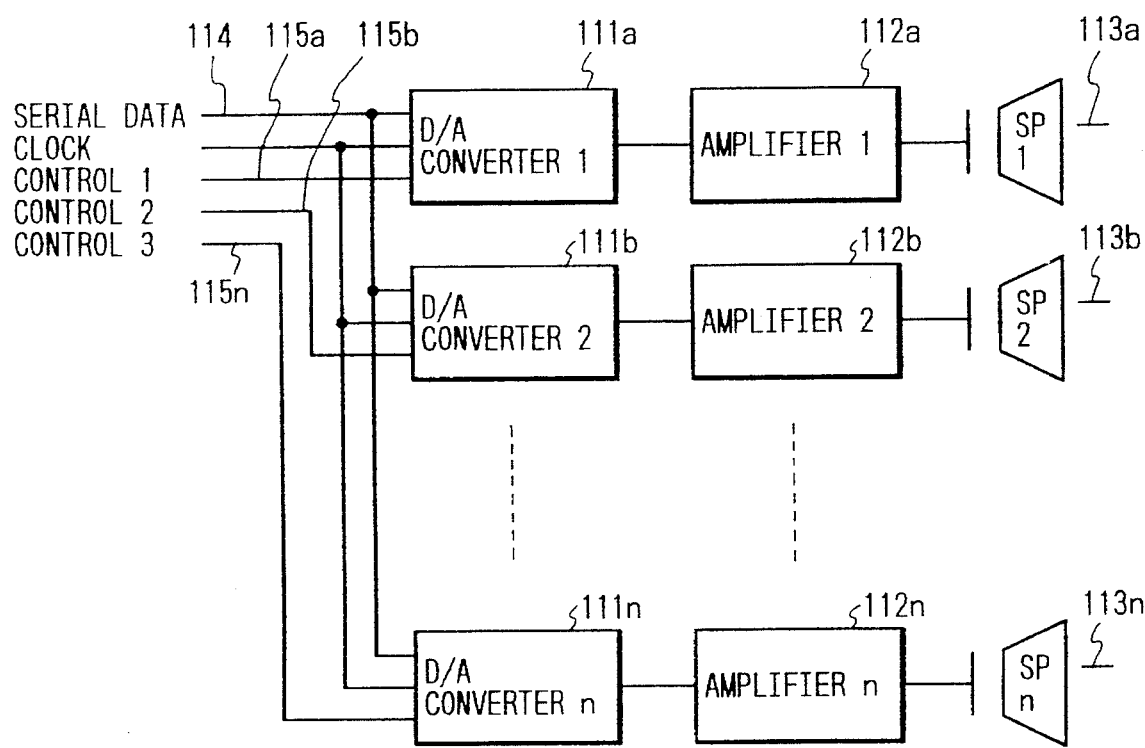
FIG. 9 is a diagram showing another example.

FIG. 9 is an example for driving speakers located at various sites with a multichannel signal in which audio is synthesized with the DSP.

In the same figure, N units of D/A converters are given the serial data containing data for N channels in one line of data signal conductor 114. Each D/A converter picks up (latches) data with a control signal supplied at the same timing as in FIG. 7. The output signals of the D/A converters are amplified by the amplifiers 112a, 112b, ... 112N to drive the speakers 113a, 113b, ... 113N, respectively.

This configuration is effective to transmit different signals to a plurality of channels.

As above described, according to the present invention, when a plurality of D/A converters of n bit input are used, the number of signal conductors is significantly reduced as compared with the parallel data input type of converter, and can be also reduced as compared with the method of inputting different signals to respective D/A converters in the serial data input type.

Figure 10:
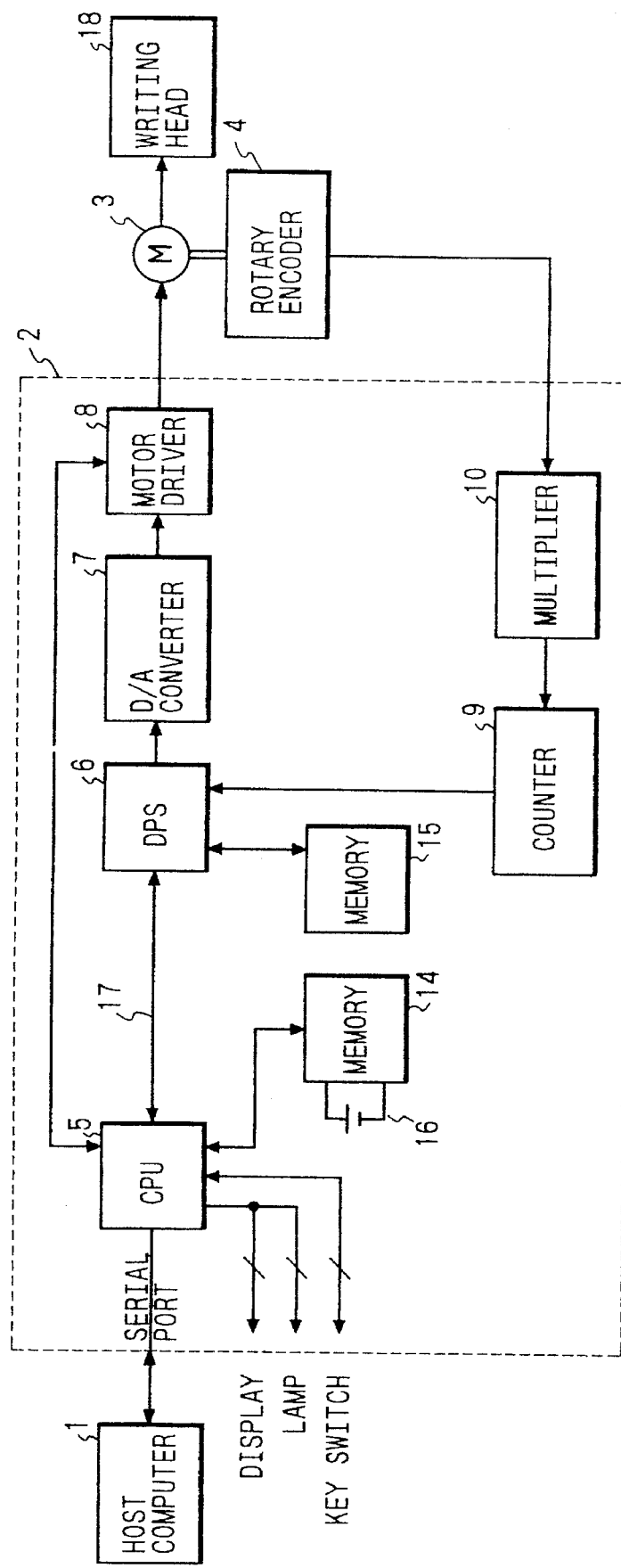
FIG. 10 is a block diagram showing an example to which the present invention is applied to a hard disk writing device.

Another example of the present invention will be described with reference to the drawings. FIG. 10 is a diagram showing one example in which the present invention is applied to a track writing device of a hard disk. In the same figure, 18 is a track writing head for a hard disk device. 3 is a brushless motor for driving the head. 8 is a linear type motor driver for driving the brushless motor. 4 is a rotary encoder for detecting the rotation angle of the brushless motor and converting it into the digital signal. 6 is a DSP (digital signal processor) for generating a command to be given to the brushless motor, by performing the digital operation of a command input value and the current position and speed data from the rotary encoder in accordance with a preset program. 7 is a D/A converter for converting the digital output signal of the DSP 6 into the analog signal for input into the linear type motor driver 8. 1 is a host CPU. An explanation thereof will now be provided.

1 is the host computer for the user with which the operator issues a command to a controller 2 which is an angular positioning device of this example. This is called as a remote mode. Besides this, there is a mode called as a "manual mode" in which the minute feed such as inching is performed using a plurality of key switches 13 on a front panel (not shown) of the controller 2 without the use of the host computer 1. A display 11 displays the rotation amount of the motor 3 and the rotary encoder 4 coaxial therewith in a seven-digit numerical value. When the rotational direction is CCW (negative) as seen from a motor shaft, a (−) sign is also displayed (but without a sign in positive direction).

The value is displayed in either the mechanical coordinate system on a basis of the Z phase signal of the rotary encoder 4, or the program coordinate system in which an arbitrary offset from the mechanical coordinate system is set (i.e., value of program coordinate=value of mechanical coordinate+offset amount).

The lamps 12 will be described (see FIG. 11 showing a front panel layout). Various lamps attached to the panel have the following meanings.

1. Servo on (SERVO ON)

Shows that the power of servo system is turned on by lighting up.

2. Synchronism (SYNC)

Lights up in a state where the mechanical coordinate system has been established. When this lamp does not light up, all operations associated with the axis movement are disabled except for the origin return.

3. Alarm (ALARM)

Shows that the system has detected an abnormality. The meaning of alarm can be obtained via the host computer.

4. Inposition (INPOS)

Lights up when the servo system has reached a specified target position.

The key switches 13 will be described (see FIG. 11 showing a front panel layout).

Various key switches attached to the panel have the following means.

1. Servo on Switch

The servo on state is made effective when this switch is depressed at the servo off, and a servo on lamp lights up. This switch is a momentary type which is only effective during depression thereof. To turn on the servo power, depress this switch until the servo on lamp lights up.

2. Emergency Stop Switch

If this switch is turned into the ON position, the emergency stop state is effective while a lamp mounted on this switch light up, the servo is turned off, and the servo on lamp is put out. When this switch is at the ON position (or the lamp lights up), the servo is not turned on even if the servo on switch may be depressed. To turn on the servo, this emergeny stop switch must be turned into the OFF (lamp extinction) position. This switch is a toggle type in which once depressed, it is placed in the ON state, and if depressed once more, it is in the OFF state. This switch is effective at all times irrespective of the operation mode or operation state.

3. Mode Change-Over Switch

This system has two operation mode: a manual mode and a remote mode. The mode change-over switch is used to change these two modes. In the remote mode, either of RS232C or RS422 communication method can be selected. The mode change-over switch is used for the selection of this communication method. When the mode change-over switch is at either RS232C or RS422, the system is automatically put in the remote mode.

4. Origin Return Switch

This switch is only effective in the manual mode, and if this switch is depressed in the manual mode, the motor moves to the origin in the mechanical coordinate system. If this switch is depressed immediately after the power is turned on, the Z phase sensing operation of a detector is simultaneously performed. This switch is a momentary type.

5. CW, CCW Switch

This switch is only effective in the manual mode. The motor continues to rotate at a constant rate in a CW (clockwise) direction as seen from the motor axis side, while this CW switch is being depressed. If the CCW switch is depressed, the motor rotates in a reverse (counterclockwise) direction to that of the CW switch.

6. RESET switch

This switch is used to reset the hardware. The system is placed in the same state as at the power on.

Next, the operation mode ( "manual mode" and "remote mode") will be described.

(Manual Mode)

In the manual mode, a positioner can be operated by itself using the key switches on the panel, not via the communication line. In the following, a typical operation procedure in this mode will be described.

1. Select the manual mode by turning the mode change-over switch to the MANUAL position.

2. Turn on the servo power by depressing the servo on switch. Then the servo on lamp lights up, indicating that the power of the servo system has been turned on.

3. Depress the origin return switch. The motor automatically moves to the origin in the mechanical coordinate system. Then the synchronism (SYNC) lamp lights up, indicating that the mechanical coordinate system has been established.

4. Rotate the motor into an arbitary position by depressing either the CW or CCW switch. In accordance with a rotation angle of motor, the number of pulses corresponding to the rotation angle of motor is displayed on the display.

(Remote Mode)

The remote mode is a mode in which the positioner operates in accordance with a command from the hose computer via the communication line. As communication means, either of RS232C or RS422 can be selected. The remote mode is automatically selected by turning the mode change-over switch on the panel into either RS232C or RS422.

(Communication Means)

The communication method usable in this system is via either of RS232C or RS422. The communication uses the data conductor and the grounding conductor, without the use of other control signals.

(Command Format)

In this section, the theoretical specification (protocol) for communication will be described. A command from the host computer to the positioner is executed by transferring a string in ASCII. The general format of command data is as follows.

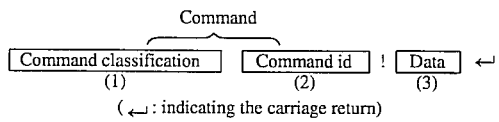

( ↵ : indicating the carriage return)

(1) Command Specification

One character in ASCII indicating a large classification of command.

C: Command

P: Parameter

S: Response to the host (2) Command id

Numerical value indicating a small classification of command (hexadecimal)

(3) Data

Data for use as an argument of command

The content of command is specified as follows.

1) Reset (C0 ↵)

Resets the system to the initial state at the power on. The state of the system is initialized into the following mode.

1. Coordinate system: Mechanical coordinate system
2. Position command method: Incremental type
3. Acceleration/deceleration: None 2) Alarm reset (C1 ↵)

Erases once the alarm (echo) generated in the system. However, if no cause of alarm has been cleared, the alarm is set again.

3) Origin return (C2 ↵)

The same operation as in depressing the origin return switch in the manual mode.

4) Servo ON/OFF (C4/data ↵)

Commands the servo to be turned ON/OFF. When the servo is turned on, "1" is set to data, while when it is turned off, "0" is set. If the servo is turned on, the servo on lamp on the panel lights up, and the motor is placed in a servo lock state.

5) Driver reset (C6 ↵)

Resets an error of servo amplifier (overcurrent, overload).

6) Start (C8 ↵)

If this command is sent from the host computer after setting of a target speed and a target position in the servo on (in which the servo on lamp lights up) and an origin return completed state (in which the SYNC lamp lights up), the motor moves to the target position. During the movement, the inposition lamp is put out, and if the motor has reached the target position, the inposition lamp lights up.

7) Stop (CA ↵)

If this stop command is issued during the rotation of motor with the start command as above, the motor stops at a position where it has received the stop command, without reaching the target position.

8) Display counter clear (CC/data ↵)

This command is only effective when the origin return has completed and the motor is not rotating. If this command is received with data set at "1", the positioner sets the currently displayed coordinate on the display as an origin on the program. The coordinate system set in this way is called as a program coordinate system. Also, the intrinsic coordinate system set on the motor is called as a mechanical coordinate system. The mechanical coordinate system is established at the operation of origin return. If this command is issued with data set at "1", the coordinate system is placed in the program coordinate system, while it is issued with data set at "0", it is returned to the mechanical coordinate system. The mode in which the system operates in the program coordinate system is called a program coordinate more, while the mode in which the system operates in the mechanical coordinate system is called a mechanical coordinate mode.

9) Position command method (C10/data ↵)

Determines how the position data given by the target position of C14 is to be interpreted. There are two position command methods: an absolute coordinate command (absolute type) and a relative coordinate command (incremental type). The absolute coordinate command is a method of indicating the offset from the origin in the mechanical coordinate system (or program coordinate system). On the other hand, the relative coordinate command is a method of indicating the offset from the current position, whether it is in the mechanical or program coordinate system. If this command (C10) is issued with data set at "0", the system is placed in the absolute coordinate mode, while if it is issued with data set at "1", the system is placed in the relative coordinate system. This mode is effective until a next C10 command is issued. Also, if the reset command (C0) is issued, the system is placed in the relative coordinate mode.

10) Acceleration/deceleration ON/OFF (C12/data ↵)

Commands whether the acceleration or deceleration is to be made for the movement command. If this command is issued with data set at "1", acceleration/deceleration is performed. The acceleration/deceleration method can be changed with a parameter (PE).

11) Target position (C14/data ↵)

Commands the target position to be supplied to the servo system in terms of the number of pulses. Data is given in a decimal number. The meaning of data is different depending on the absolute coordinate mode or relative coordinate mode (C10).

12) Target speed (C16/data ↵)

Commands the target speed to be supplied to the servo system in terms of the number of pulses per second. Data is given in a decimal number.

13) Current position request (C18/data ↵)

Returns the servo position at a time when this command has arrived at the system. The return value is a position in the mechanical coordinate system if data is "0", or in the program coordinate system if data is "1". Data returned to the host has the following format.

Mechanical coordinate S0/ mechanical coordinate value ↵

Program coordinate S1/program coordinate

14) System Status Request (C1A/ ↵)

Returns the current state of the system in hexadecimal. When each bit of status information is "1", the following is meant

| 7 | 6 | 5 | 4 | 3 | 2 | 1 | 0 |
|---|---|---|---|---|---|---|---|
| ALRM | * | * | * | SRVON | INPOS | BUSY | SYNC |

Bit0 <SYNC>　　Completion of synchronization
　　The synchronization is completed and the mechanical coordinate system is established.
Bit1 <BUSY>　　During the servo movement
　　The servo is moving.
Bit2 <INPOS>　　Inposition
　　The servo system has reached the target value.
Bit3 <SRVON>　　Servo ON
　　The servo power is on.
Bit7 <ALARM>　　Alarm An abnormality has occurred in the system. Data to be returned to the host has the following format.

S02/status information (hexadecimal) ←↲

The content of actual alarm can be confirmed with the next "system alarm request" by the operator.

15) System alarm request (C1C/ ←↲)

Return the abnormality (alarm) currently occurring in the system in hexadecimal. When each bit is "1" in the alarm information, the following is meant.

| F | E | D | C | B | A | 9 | 8 | 7 | 6 | 5 | 4 | 3 | 2 | 1 | 0 |
|---|---|---|---|---|---|---|---|---|---|---|---|---|---|---|---|
| * | * | TRN | STA | DSP | PAR | COM | FOM | E_STOP | HAT | CUR | SRV | * | INP | CNT | STK |

| Bit0 | <STK> | Stroke over |
| Bit1 | <CNT> | Position error over |
| Bit2 | <INP> | Inposition over time |
| Bit4 | <SRV> | Servo error |
| Bit5 | <CUR> | Overcurrent |
| Bit6 | <HAT> | Overload |
| Bit7 | <E_STOP> | Emergency stop |
| Bit8 | <FOM> | Command format error |
| Bit9 | <COM> | Data error |
| BitA | <PAR> | Parameter error |
| BitB | <DSP> | DSP abnormality |
| BitC | <STA> | Status error |
| BitD | <TRN> | Communication error |

Data to be returned to the host has the following format.

S03/alarm information (hexadecimal)←↲

Next, an operation procedure in the remote mode will be described.
(Remote Operation Procedure)

1) Connect a communication cable to an RS232C (or RS422) connector on the front panel to join with the host side.

2) Turn the mode change-over switch to an RS232C (or RS422) position to select the remote operation mode.

3) Place the host side to the start condition.

4) Send the command as explained in the previous section from the host side to the positioner to perform the remote operation.

(Program Method on the Host Side)

When the remote operation is performed in this system, the initiative of communication is always on the host side. For example, when the servo ON processing is performed, the procedure is as follows.

1) Send the "servo ON command" from the host side to the positioner (C4/1 ←↲).

2) Send the "status request command" from the host side to the positioner (CIA ←↲).

3) The host side reads the "status information" (S02/xx ←↲) returned from the positioner.

4) Repeat 2) and 3) until the servo ON state begins.

5) Transfer to the next processing after the servo ON state is confirmed with the status information.

Whether or not the command is being executed can be determined by seeing the BUSY bit of status information. Most of the commands are immediately executed when the command has been transmitted, but the next processing is required to wait for the completion of command by seeing the BUSY bit or SRVON bit.

Servo ON/OFF (C4/x ←↲)

Origin return (C2 ←↲)

Start command (C8 ←↲)

The above commands generate a status error if the next command is sent to the positioner without confirming the completion of command, and the command is not executed. On the other hand, the command requesting any of the following three positioner statuses is always effective.

Status request command (C1A ←↲)

Alarm information request command (C1C ←↲)

Current position request command (C18/x ←↲)

With the above method, the user can perform the operation of the host.

Next, the controller 2 will be described for the function for each block with reference to the entire structure of the embodiment as shown in FIG. 10.

As previously described, various parameters are sent out through the serial I/O port (RS232C) from the host computer, while various output signals are sent from the controller 2, in accordance with the situation, under the control of the CPU5 for administration. Besides that, the function of the CPU5 is to perform the I/O control for the display 11, the lamps 12 and the key switches 13, and the control of communication functions. The action of the CPU5 is supported by a memory 14 which is backed up by a battery 16.

Likewise, the action of the DSP6 is supported by a dedicated memory 15. A data bus line 17 extends between the CPU5 and the DSP6 to communicate data therebetween.

Also, the CPU5 and a motor driver 8 are connected by the I/O signal line for administration mainly associated with the overheat. The output signal of the rotary encoder 4 is multiplied 40 times through a multiplier 10, and then the number of pluses is counted by a counter 9. The real time count data is sent to the DSP6 to be used as the position data. Note that the Z phase signal (origin) from the rotary encoder 4 is also entered into the multiplier 10 and the counter 9, but not multiplied and directly used as a reset pulse of counter within the counter 9. The DSP6 performs the movement amount operation for the motor 3, in real time, for the transmission to the D/A converter 7 as the digital data of an electric current value necessary for driving the motor 3. Here, the digital data is converted into the analog data capable of driving the motor, which is then converted into a current value sufficient to drive the motor 3 by a linear servo driver called as a motor driver 8. As the motor 3 is here a three-phase brushless motor, the D/A converter 7 and the motor driver 8 are required to three phases for U, V and W, that is, three groups are required (the corresponding number required).

Next, the above actuation will be described.

First, the operation condition (such as track pitch) for writing the track of hard disk is specified in the host CPU6, which then transmits the specified operation condition to the DSP3.

The DSP controller 3 creates a current position signal of the writing head 7 (a rotor for the brushless motor 1) by counting the digital output signal from an incremental encoder 5, uses the difference between that current position and a specified target position as the movement amount, and outputs a speed command corresponding to this movement amount to the D/A converter 4.

Also, to perform the detection and direction discrimination for an origin position of the incremental encoder 5 and a fine positioning of the writing head, the output pulse from the encoder is divided, performing an operation for enhancing the resolution.

Also, by determining the movement amount from the difference between the current position signal and the specified target position signal, a speed command is generated in accordance with a predetermined rule of correspondence. To perform the positioning with high precision and at a high speed, there are some cases where the correspondence rule must be nonlinear.

For example, the movement amount as shown in FIG. 8 non-linearly corresponds to the speed command. The motor drive signal which is made an analog signal by the D/A converter 7 is amplified in power by the linear type motor driver 2 to drive the brushless motor 3 and to allow the writing head 18 to perform a predetermined operation.

Here, since the motor driver 2 is a linear type, the occurrence of noise is quite small and the linearity can be maintained in a minute displacement area, so that a highly accurate control is enabled. Also, since the writing head 18 has a high impedance, noise is likely to be generated, whereby the linear type motor driver 8 which causes a quite little noise is necessary. The brushless motor 3 has an excellent controllability, because the occurrence of electrical and mechanical noises is small owing to no mechanical sliding portions.

The above example will be further described.

Figure 12:
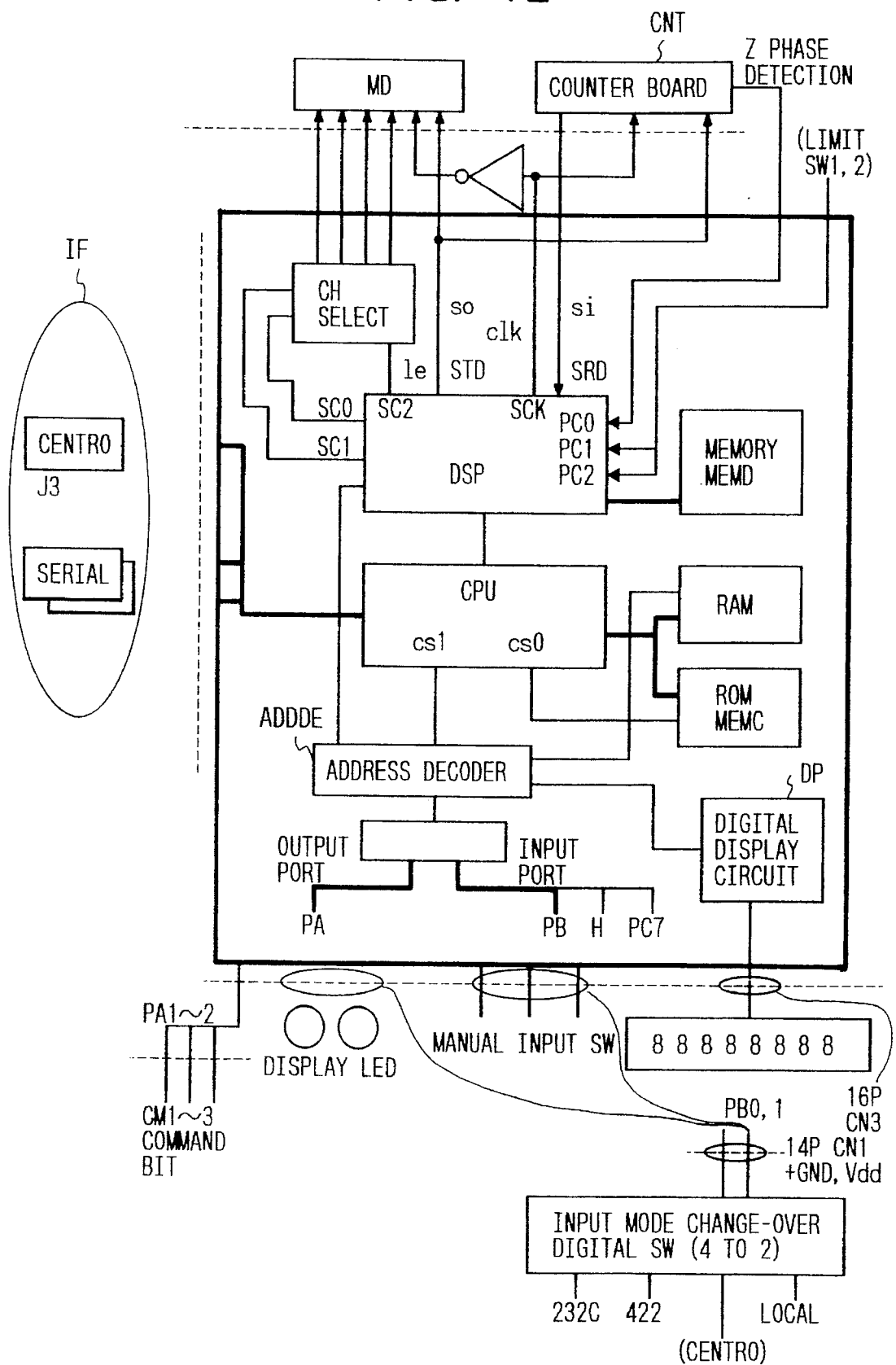
FIG. 12 is a block diagram of a controller with a CPU and a DSP.
Figure 13:
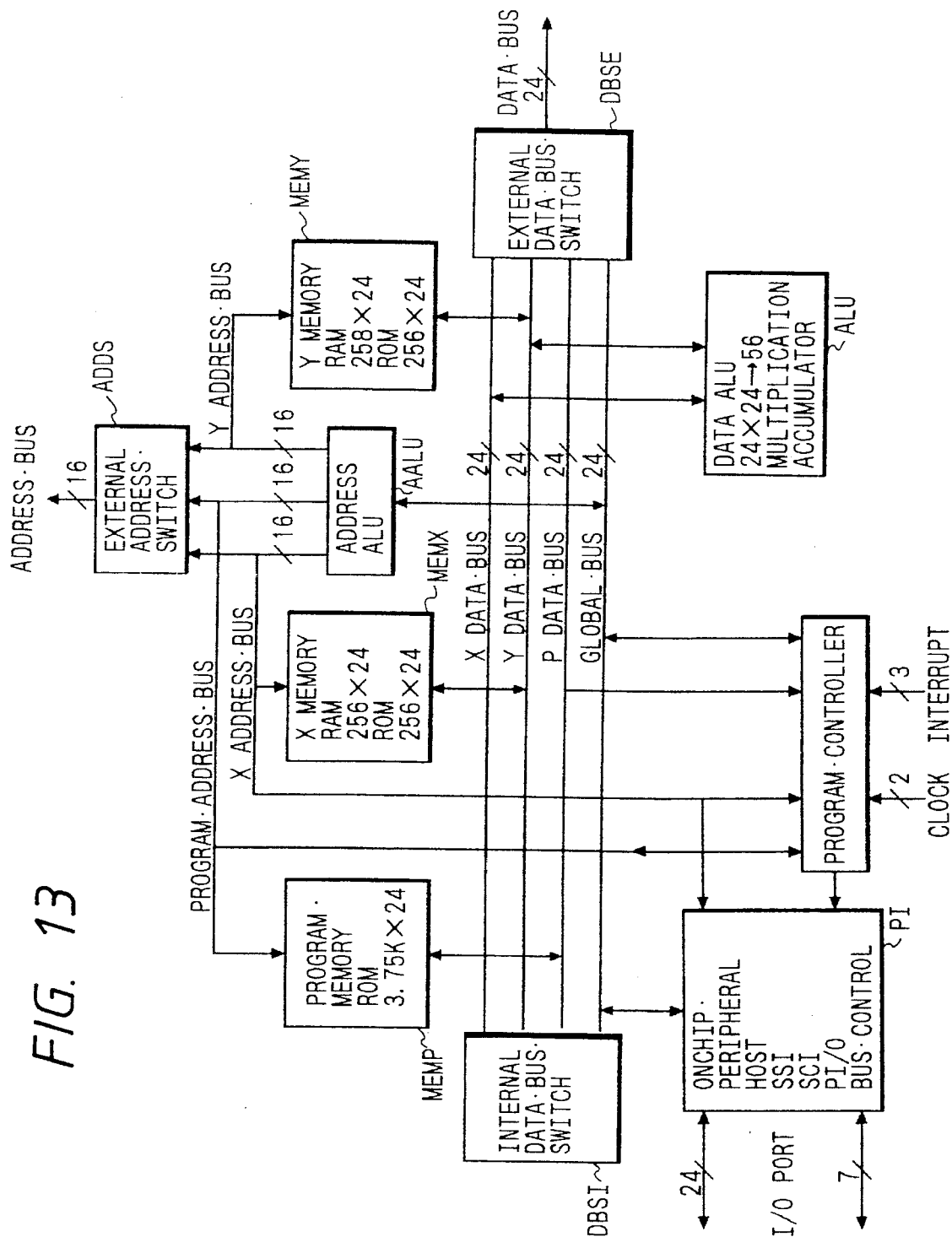
FIG. 13 is a block diagram of the DSP.

FIG. 12 is a further block diagram of the controller. In the same figure, the DSP is a digital signal processor, which is used here for the operation of the control amount for the servo system. FIG. 13 is a further block diagram of the digital signal processor DSP. As shown in the same figure, there is provided via an address bus for transmission and reception of the address from the external, an address switch ADDS, an address processor AALU for the address calculation, memories for X and Y addresses MEMX, MEMY, a memory for program MEMP, data bus switches connected to internal and external data buses DBSE, DBSI, a processor for data processing ALU, a controller for reception of clock and interrupt CONT, and a peripheral circuit PI for connection to the peripheral. Returning to FIG. 12, MEMD is a high speed accessible memory into which the program executed by the digital signal processor DSP is loaded.

The CPU is a processor for managing the controller, and causing the digital signal processor DSP to perform the operation. MEMC is a program memory in which programs executed by the processor DSP and CPU are stored. The processing procedures of respective programs are shown in FIGS. 16 to 23. The program for the processor DSP is loaded from a memory ROM via the processor CPU and the processor DSP into the memory MEMD, and executed in the processor DSP. In this way, the execution processing of the processor DSP is made faster. RAM is a memory for temporarily storing processing data or status data. ADDDE is an address decoder by which a command from the input port is passed to the processor DSP and CPU. DP is a display circuit for displaying the internal information and state. CNT is a counter by which the signal received from an encoder is transmitted to the DSP. MD is a motor driver for passing the output from the processor DSP to the brushless motor.

IF is an interface for implementing the communication between the processor CPU and the external host computer.

Figure 14:
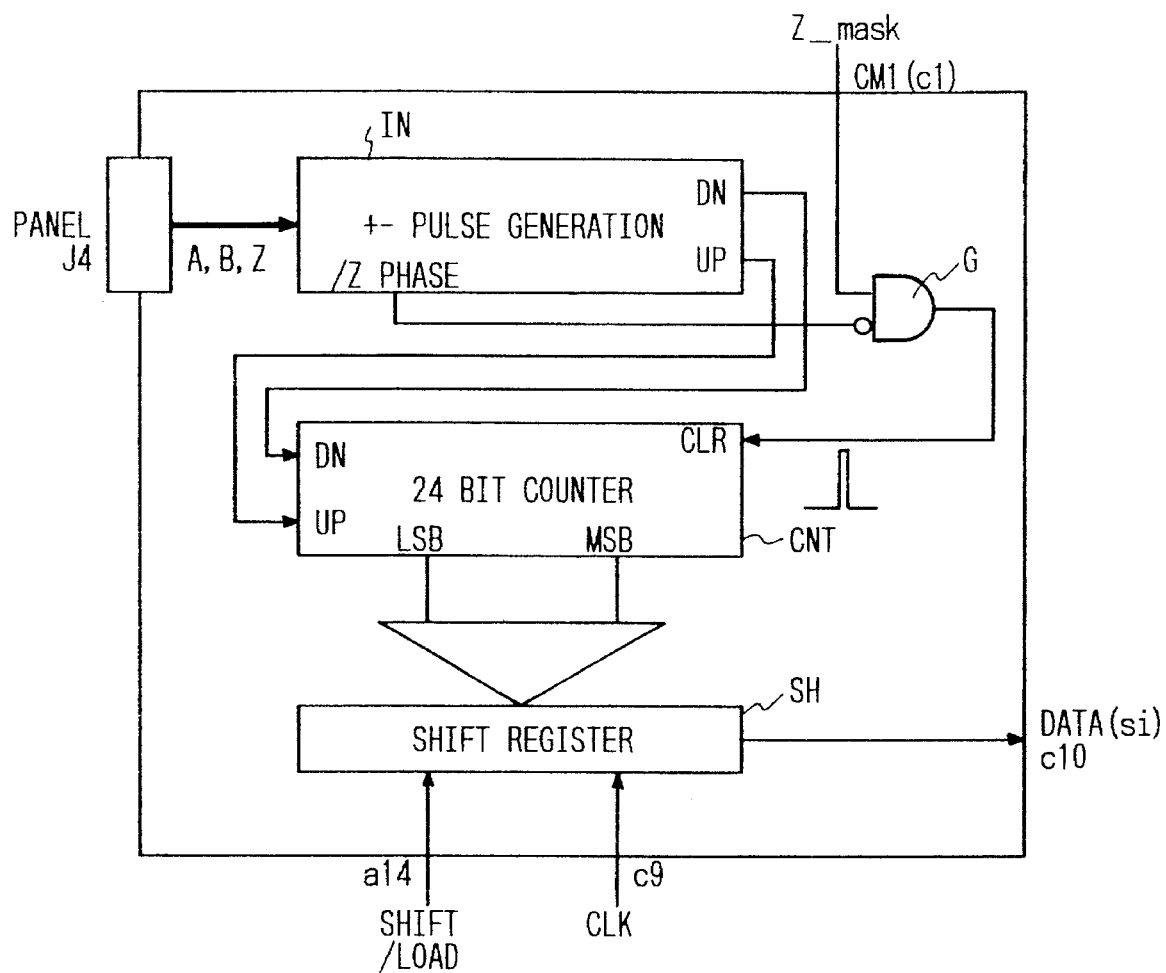
FIG. 14 is a block diagram of a counter.

The details of the counter as described are shown in FIG. 14. IN is an input section in which the signal is accepted from the encoder and the Z phase direction and pulses are discriminated to produce a respective signal. G is a gate for controlling the Z phase signal. CNT is a counter by which the signal from the input section IN is accepted, and counted up or down, and which is cleared by the gate G signal (initial value).

SH is shift register by which the output of the counter is transformed from parallel to serial form and then transmitted to the processor DSP. Note that as the gate G is adapted to open or close with a program instruction from the DSP, the Z phase signal is used to clear the counter as necessary.

Figure 15:
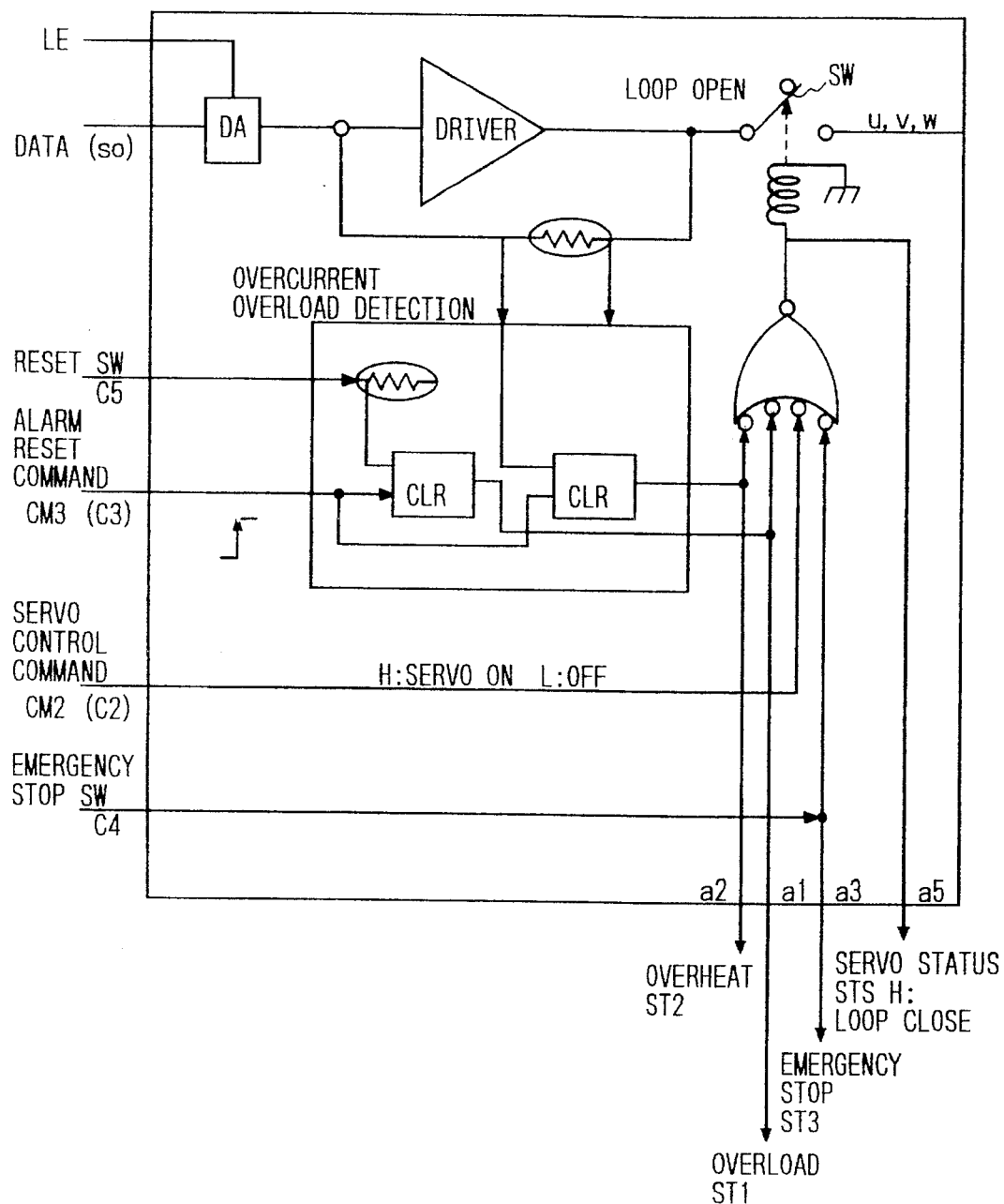
FIG. 15 is a block diagram of a motor driver.

FIG. 15 is a detail diagram of the motor driver MD, which separates data from the processor DSP into U, V and W phase, and transmits a drive signal to the motor. In the figure, DA is a digital/analog converter, in which the analog signal is amplified by the driver and applied to the motor. SW is a switch, which is turned off with a command such as overheat, overload or emergency stop.

If the processor CPU is started with the power on or a command from the host computer, a program for processor DSP, among the programs of memory ROM, is loaded into a memory RAMD through the communication between the processors DSP and CPU, and after the termination, the processors CPU and DSP are placed in a wait state.

Figure 16:
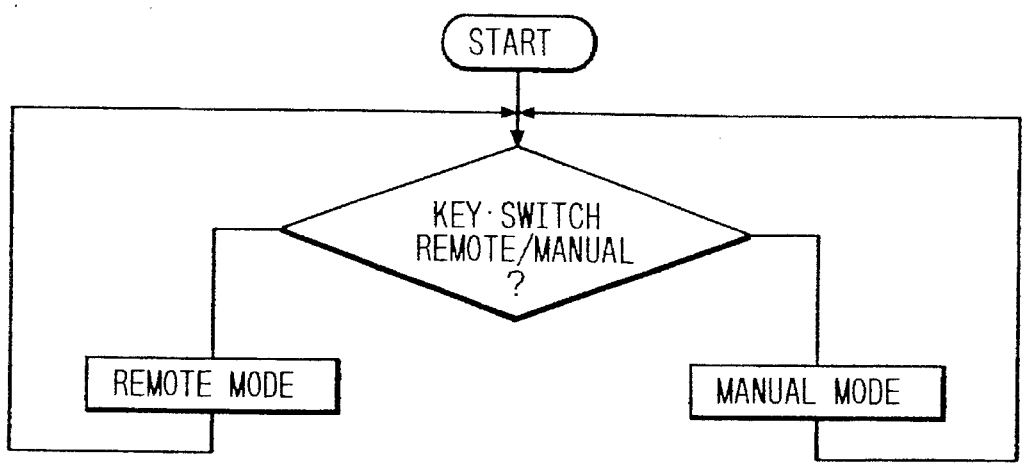
FIG. 16 is a flowchart showing a control sequence of the CPU.

First, the processor CPU determines whether the key switch is in a remote mode or a manual mode, as shown in FIG. 16, to perform a respective processing operation. The remote mode operates with a command from the host computer, while the manual mode operates with a manual switch of the controller.

Figure 17:
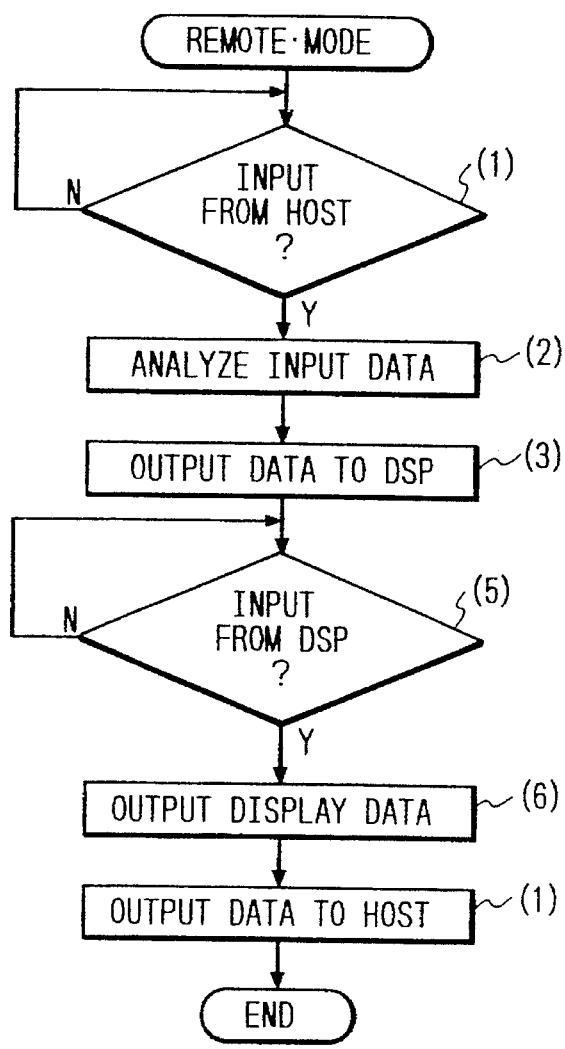
FIG. 17 is a flowchart showing a control sequence of the CPU.

In the remote mode, the processing is performed as shown in FIG. 17.

The processor CPU performs the processing as follows. A determination is made whether or not there is any input information from the host, in which if it exists, the procedure proceeds to the next step, where the input information is analyzed and data is output to the processor DSP.

Next, the procedure waits for a response from the processor DSP, and if there is any input information from the processor DSP, the information is sent to a digital display circuit DP and displayed, and also sent to the host computer directly or with some processing, and then the procedure returns to the start.

If the mode is a manual mode, a determination is made whether or not the manual switch SW is operated, and if operated, the input key is analyzed, the information is sent to the processor DSP, and then the procedure waits for a response from the processor DSP. If there is any information from the processor DSP, the information is sent to the display circuit DP and displayed, and then the procedure returns to the start.

Next, the actuation of the processor DSP will be described.

Figure 19:
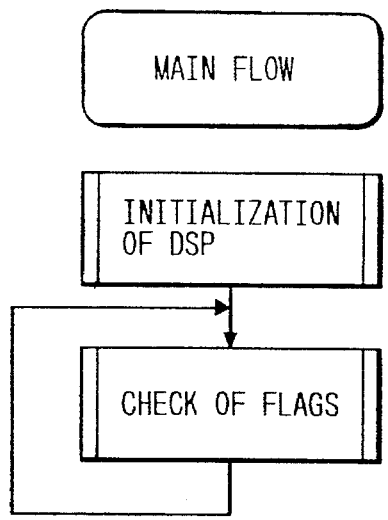
FIG. 19 is a flowchart showing a control sequence of the DSP.
Figure 20:
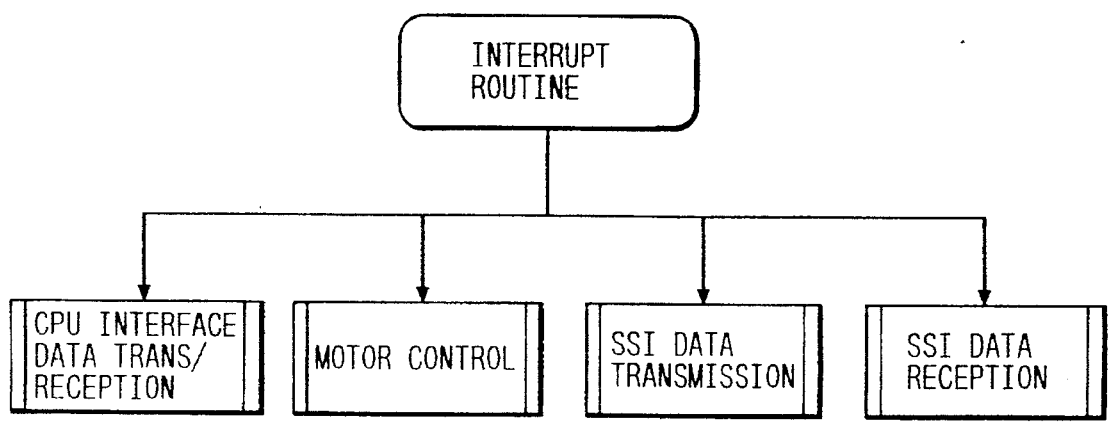
FIG. 20 is a flowchart showing a control sequence of the DSP.

As shown in FIG. 19, the processor DSP is initialized and the internal flags are checked. In such a state, if there is any interrupt in an interrupt port, the interrupt processing is started as shown in FIG. 20. Here, the reception processing of data from the processor CPU, the motor control processing, the transfer processing of data to the motor driver, and the reception processing of data from the counter are performed. The above configuration was adopted to execute the processing on time.

Figure 21:
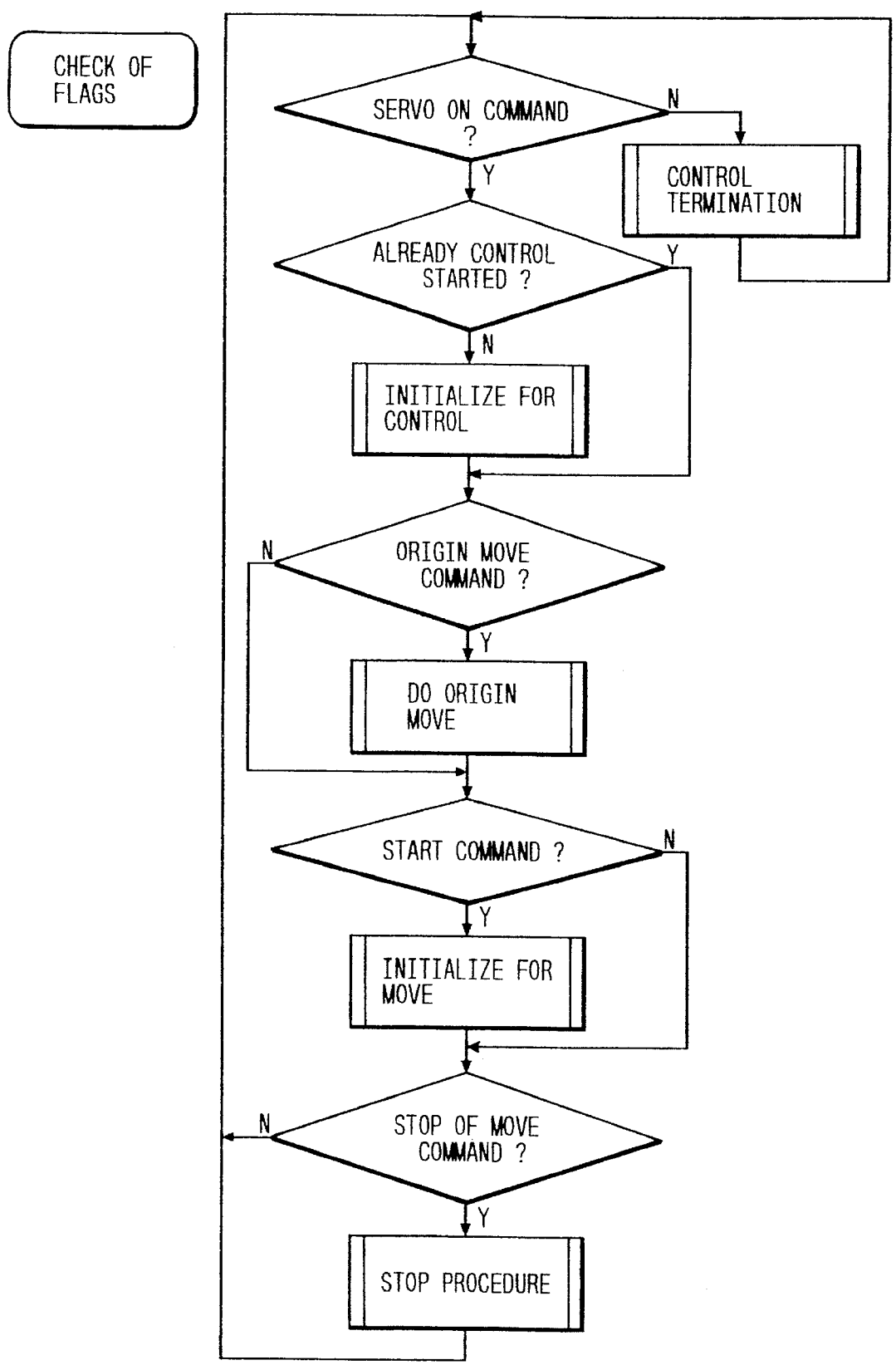
FIG. 21 is a flowchart showing a control sequence of the DSP.

Next, the flag check processing as shown in FIG. 21 will be described below.

First, a determination is made whether or not there is any servo on command, in which if not, the procedure proceeds to the control termination, and if any, it is checked whether or not the control has already started. If NO, the control is initialized and then the procedure proceeds to the next step. Then a determination is made whether or not there is any origin movement command, and if any, the control object is moved to the origin. Next, it is checked whether or not there is any start command (target position), and if any, the control object is started. If it has reached the target position, the movement is stopped and the processing is terminated.

Figure 22:
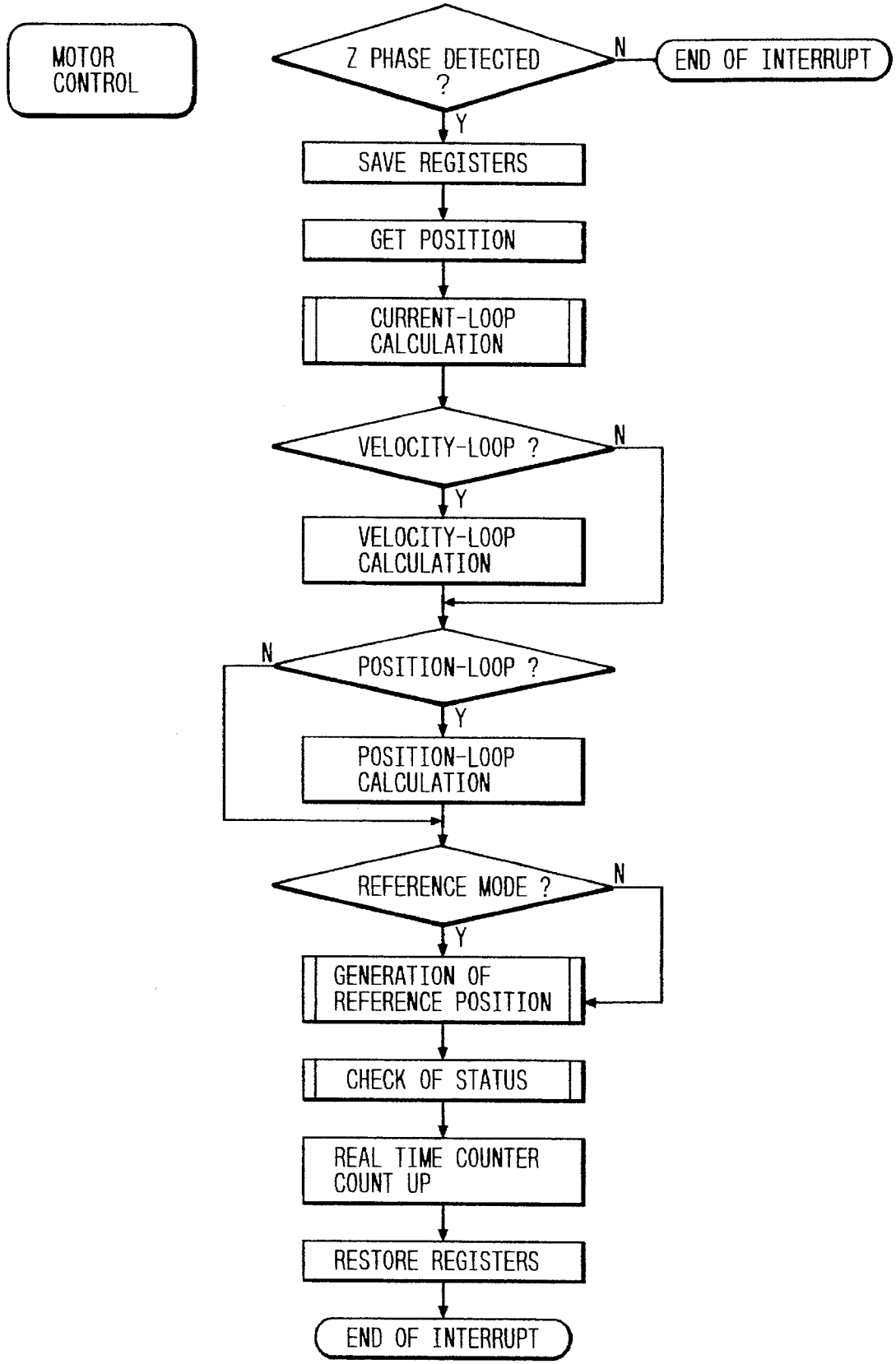
FIG. 22 is a flowchart showing a control sequence of the DSP.

Next, the motor countrol processing will be described with reference to FIG. 22.

First, a determination is made whether or not the Z phase is detected, in which if NO, the processing is terminated, while if YES, the following processing is continued. The contents of registers are saved, and the current position information is fetched from the counter.

Next, the current loop is calculated. Then a determination is made whether the loop is a speed loop or a position loop, by seeing the value of the internal counter, and a respective calculation is performed.

Next, it is examined whether or not there is any reference value, and the next processing is performed by using the reference value if any, or generating it if not.

Next, the status is checked to count up in the internal counter, the saved values are restored to the registers, and then the processing is terminated.

Figure 23:
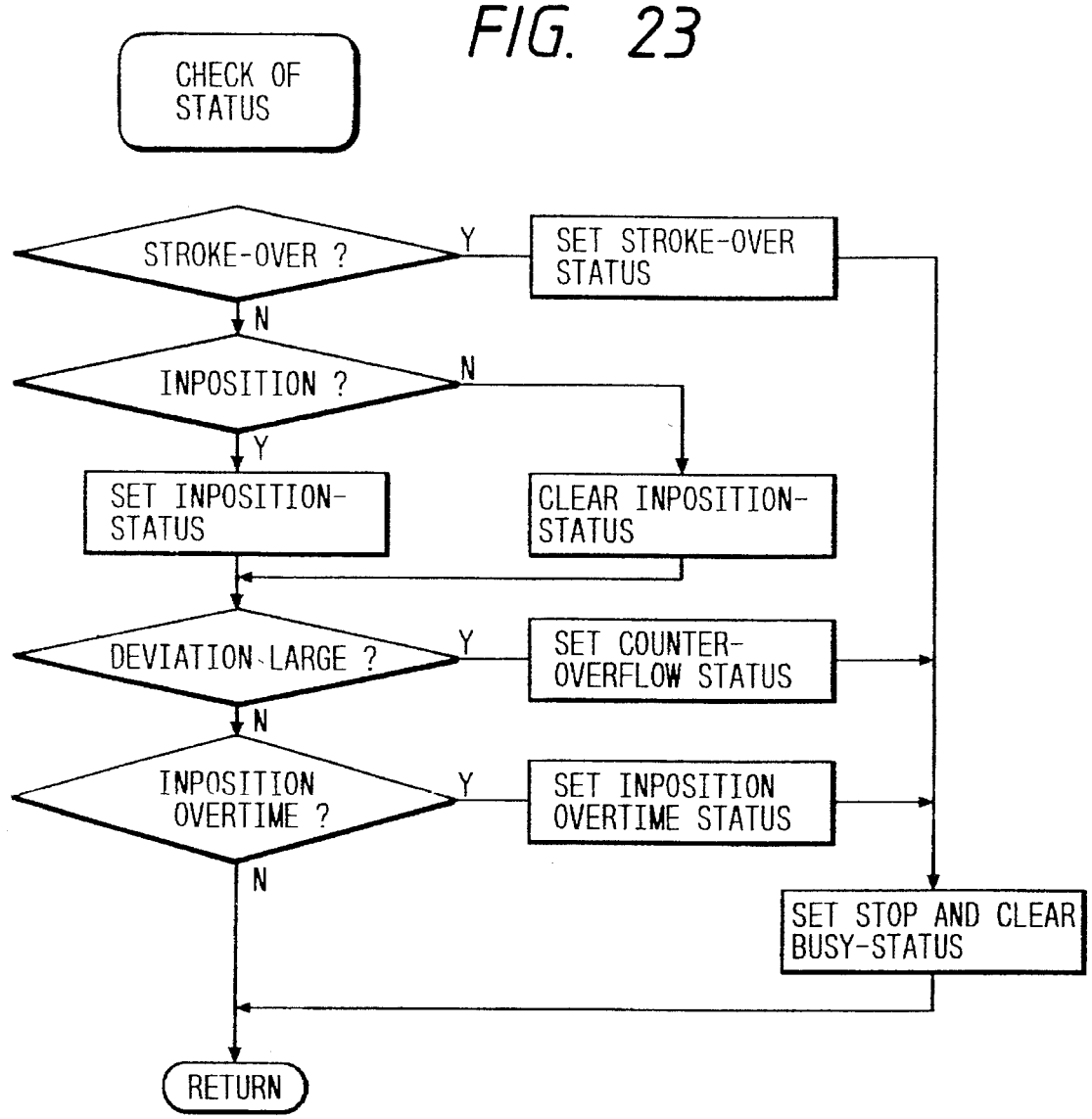
FIG. 23 is a flowchart showing a control sequence of the DSP.

The status check processing will be described with reference to FIG. 23.

First, a determination is made whether or not the stroke is over. This can be determined depending on whether or not the rotation angle of motor exceeds a limit in the positive or negative direction, which has been preset with a parameter, whereby if it exceeds the limit, the stroke is over, the flag for stroke over status is set, an stop instruction is set, the busy status is cleared, and the processing is terminated.

On the other hand, if the stroke is not over, a determination is made whether or not there is any object at the target position. If any, the inposition status indicating that the object is at the target position is set, while if not, the inposition status indicating that the object is at the target position is cleared.

Next, it is examined whether or not the position deviation is too large, in which if NO, a determination is made whether or not the object has reached the target position within a set time, and if not overtime, the processing is terminated. If the position deviation is too large or the inposition is overtime, the counter overflow status or inposition overtime status is set, the stop instruction is set, the busy status is cleared, and the status check is terminated.

Figure 24:
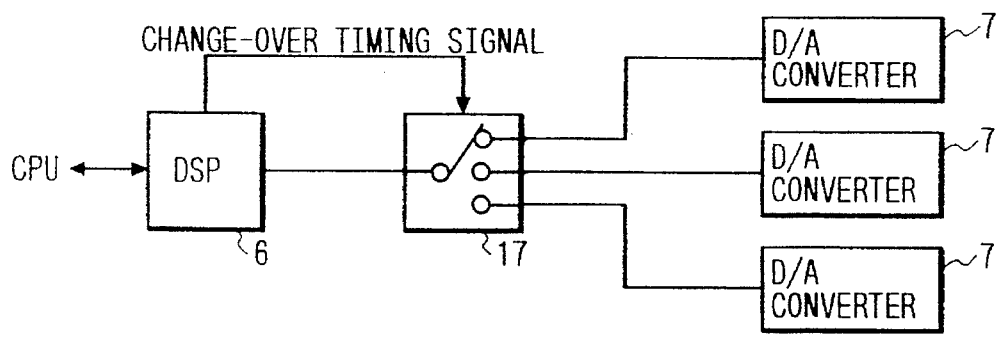
FIG. 24 is a block diagram showing another example.

In FIG. 1, the D/A converters 7 are necessary corresponding to the number of motors, and if the digital data, for example of three phase, is transmitted from the DSP6, the number of data to be transmitted to the D/A converters 7 may be reduced due to the restriction of data bus line, which makes it difficult to drive the motors 3 at high resolution, whereas the second example is to place a multiplexer 17 between the DSP 6 and the D/A converters 7 having the corresponding number, as shown in FIG. 24, and to overcome the above restriction.

Since positioning with high precision is allowed without a conventionally required wide space or the control of the air flow (including the temperature) in an air conditioned environment, the total cost per unit can be largely reduced. Accordingly, the cost of a product manufactured by the use of device can be reduced. Along with a higher density of the hard disk, higher precision and resolution are required in writing the servo track, and if the servo track which serves as a reference of high precision is written using such an external accurate positioning device (rather than a head actuator of hard disk drive itself), a higher precision hard disk drive can be more easily obtained, because the head actuator of product does not need very high precision.

Figure 25:
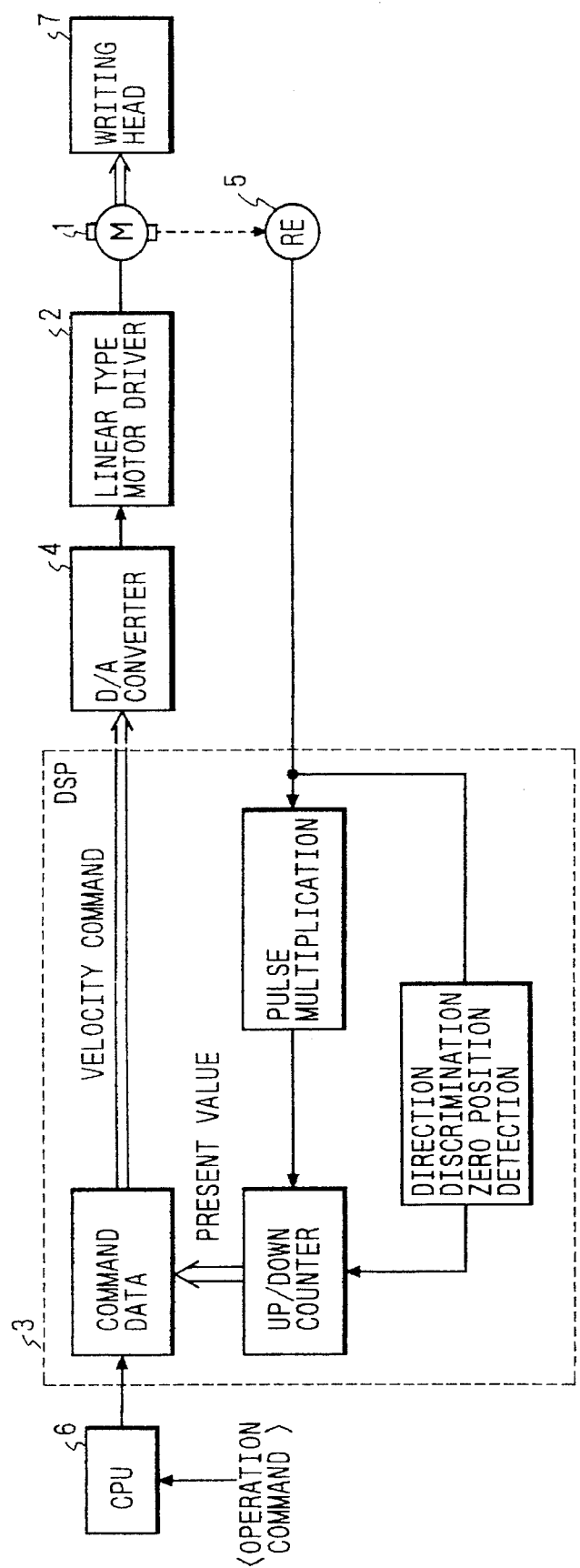
FIG. 25 is a block diagram showing an example in which the present invention is applied to a hard disk writing device.

Another example of the-present invention will be described with reference to the drawings. FIG. 25 is a diagram showing one example in which the present invention is applied to a track writing device of a hard disk. In the same figure, 7 is a track writing head for a hard disk device. I is a brushless motor for driving the head. 2 is a linear type motor driver for driving the brushless motor. 5 is a rotary encoder for detecting the rotation angle of the brushless motor and converting it into the digital signal. 3 is a DSP (digital signal processor) for generating a command to be given to the brushless motor, with the digital operation of a command input value and a current position and speed data from the rotary encoder, in accordance with a preset program. 4 is a D/A converter for converting the digital output signal of the DSP 3 into the analog signal for input into the linear type motor driver 2. 6 is a host CPU.

First, the operation condition for writing the track of hard disk (such as track pitch) is specified in the host CPU 6, which transmits this specified operation condition to the DSP 3.

The DSP 3 creates a current position signal of the writing head 7 (a rotor for the brushless motor 1) by counting the digital output signal from an incremental encoder 5, uses the difference between that current position and a specified target position as the movement amount, and outputs a speed command corresponding to this movement amount to the D/A converter 4.

Also, to perform the detection and direction discrimination for an origin position of the incremental encoder 5 and a fine positioning of the writing head, the output pulse from the encoder is divided, performing an operation for enhancing the resolution.

Figure 27:
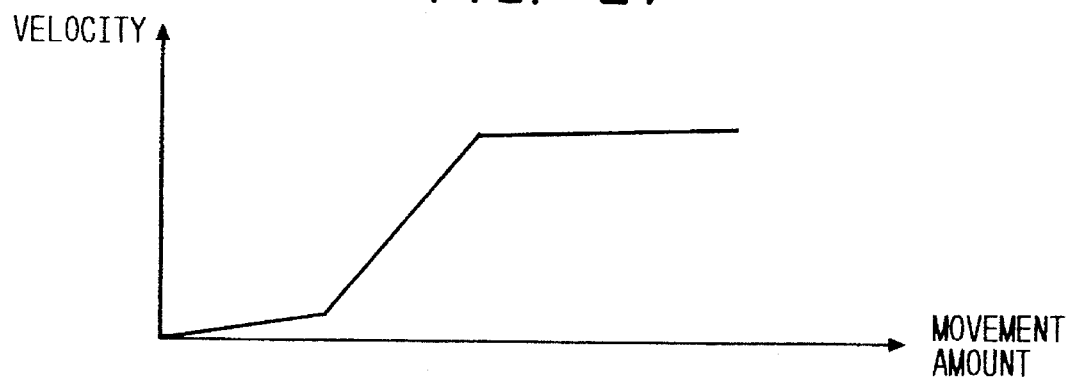
FIG. 27 is a graph showing a nonlinear control.

Also, by determining the movement amount from the difference between the current position signal and the specified target position signal, a speed command is generated in accordance with a predetermined rule of correspondence. In positioning with high precision and high speed, there are some cases where the correspondence rule must be nonlinear. In this case, for example, there is provided a table memory which makes the movement amount as shown in FIG. 27 nonlinearly corresponds to the speed command, as its implementation.

The motor drive signal which is made an analog signal by the D/A converter 4 is amplified in power by the linear type motor driver 2 to drive the brushless motor 1 and allow the writing head 7 to perform a predetermined operation.

Here, since the motor driver 2 is a linear type, the noise that occurs is quite small and the linearity is maintained in a minute displacement area, so that a highly accurate control is enabled. Also, since the writing head 7 has a high impedance, the noise is likely to be generated, so that the linear type motor driver 2 which causes a quite small amount of noise is necessary. The brushless motor 1 is allowed for an excellent controllability, with little occurrence of electrical and mechanical noises, because of the absence of mechanical sliding portions.

Next, the operation of the CPU and DSP will be described.

Figure 28:
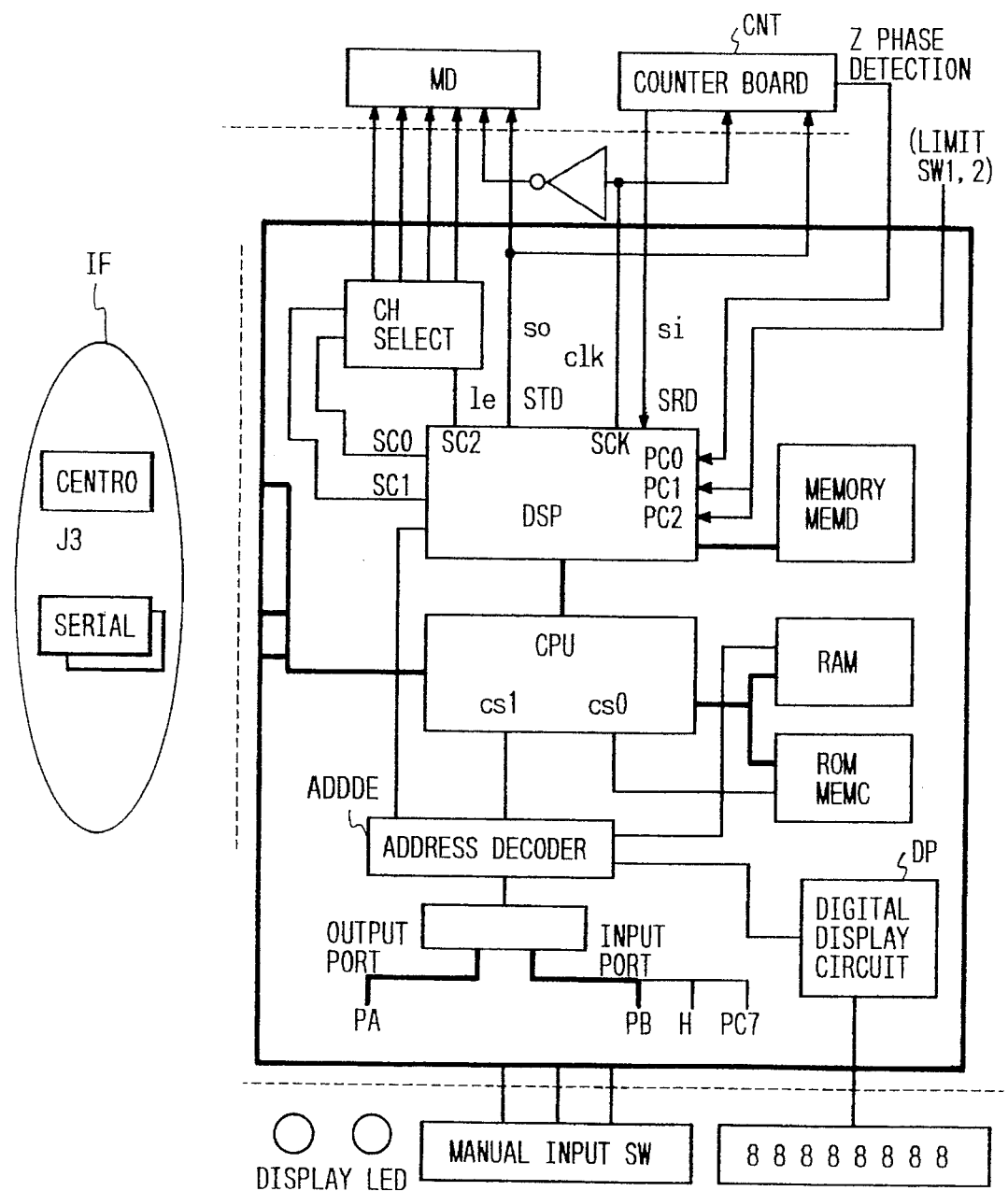
FIG. 28 is a block diagram of a controller with a CPU and a DSP.

FIG. 28 is a further block diagram of the CPU and DSP controller. In the same figure, the DSP is a digital signal processor, which is used here for the operation of the control amount for the servo system. FIG. 13 is a further block diagram of the digital signal processor DSP. As shown in the same figure, there are provided via an address bus for transmission and reception of the address from the external, an address switch ADDS, an address processor AALU for the address calculation, memories for X and Y addresses MEMX, MEMY, a memory for program MEMP, data bus switches connected to internal and external data buses DBSE, DBSI, a processor for data processing ALU, a controller for reception of clock and interrupt CONT, and a peripheral circuit PI for connection to the periphery. Returning to FIG. 28, MEMD is a high speed accessible memory into which the program executed by the digital signal processor DSP is loaded.

The CPU is a processor for managing the controller, and causing the digital signal processor DSP to perform the operation. MEMC is a program memory in which the programs executed by the processor DSP and CPU are stored. The processing procedures of respective programs are shown in FIGS. 16 to 23. The program for the processor DSP is loaded from a memory ROM via the processer CPU and the processor DSP to a memory MEMD, and exeuted in the processor DSP. In this way, the execution processing of the processor DSP is made faster. RAM is a memory for temporarily storing processing data or state data. ADDDE is an address decoder by which a command from the input port is passed to the processors DSP and CPU.

DP is a display circuit for displaying the internal information and state. CNT is a counter by which the signal received from an encoder is transmitted to the DSP. MD is a motor driver for passing the output from the processor DSP to the brushless motor.

IF is an interface for implementing the communication between the processor CPU and the external host computer.

The details of the counter as described are shown in FIG. 14. IN is an input section in which the signal is accepted from the encoder and then the Z phase, direction and pulses are discriminated to produce a respective signal. G is a gate for controlling the Z phase signal.

CNT is a counter by which the signal from the input section IN is accepted, counted up or down, and which is cleared by the gate G signal (initial value).

SH is a shift register by which the output of the counter is transformed from parallel to serial form and then transmitted to the processor DSP. Note that as the gate G is adapted to open or close with a program instruction from the DSP, the Z phase signal is used to clear the counter as necessary.

FIG. 15 is a detail diagram of the motor driver MD, which separates data from the processor DSP into U, V and W phase, and transmits a drive signal to the motor. In the figure, DA is a digital/ analog converter, by which the analog signal is amplified by the driver and applied to the motor. SW is a switch, which is turned off with a command such as overheat, overload or emergency stop.

If the processor CPU is started with the power on or a command from the host computer, a program for processor DSP, among the programs of memory ROM, is loaded into a memory MEMD through the communication between the processors DSP and CPU, and after the termination, the processors CPU and DSP are placed in the wait state.

First, the processor CPU determines whether the key switch is in a remote mode or a manual mode as shown in FIG. 16 to perform a respective processing. The remote mode operates with a command from the host computer, while the manual mode operates with a manual switch of the controller.

In the remote mode, the processing is performed as shown in FIG. 17.

The processor CPU performs the processing as follows. A determination is made whether or not there is any input information from the host, and if it exists, the procedure proceeds to the next step, where the input information is analyzed and data is output to the processor dSP.

Next, the procedure waits for a response from the processor DSP, and if there is any input information from the processor DSP, the information is sent to a digital display circuit DP and displayed, and also sent to the host computer directly or with some processing, and then the procedure returns to the start.

Figure 18:
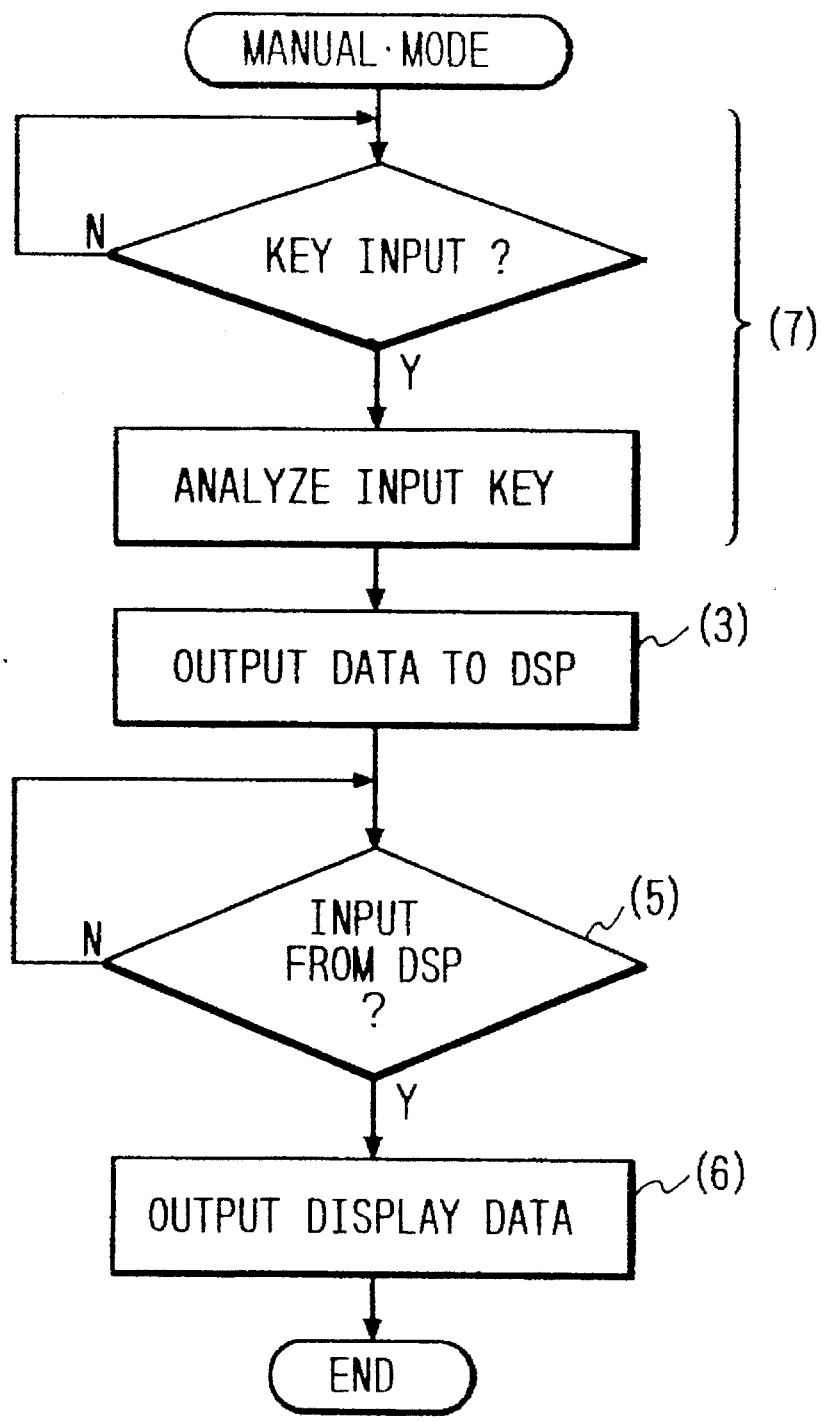
FIG. 18 is a flowchart showing a control sequence of the CPU.
Figure 26:
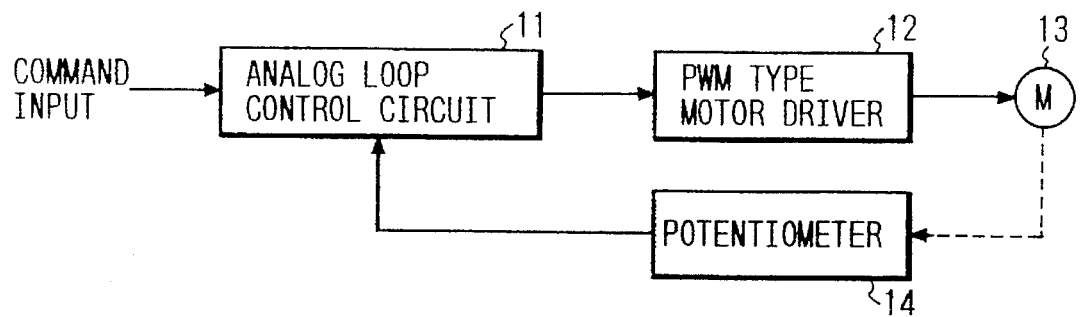
FIG. 26 is a block diagram showing a conventional example.

If the mode is a manual mode, a determination is made whether or not the manual switch SW is operated, as shown in FIG. 18, and if operated, the input key is analyzed, the information is sent to the processor DSP, and then the procedure waits for a response from the processor DSP. If there is any information from the processor DSP, the information is sent to the display circuit DP and displayed, and then the procedure returns to the start.

Next, the actuation of the processor DSP will be described.

As shown in FIG. 19, the processor DSP is initialized and the internal flags are checked. In such a state, if there is any interrupt in an interrupt port, the interrupt processing is started as shown in FIG. 20. Here, the reception processing of data from the processor CPU, the motor control processing, the transfer processing of data to the motor driver and the reception processing of data from the counter are performed. The above configuration was taken to execute the processing on time.

Next, the flag check processing as shown in FIG. 21 will be described below.

First, a determination is made whether or not there is any servo on command, in which if not, the procedure proceeds to the control termination, and if any, it is checked whether or not the control has already started. If NO, the control is initialized and then the procedure proceeds to the next step. Then a determination is made whether or not there is any origin movement command, in which if any, the control object is moved to the origin. Next, it is checked whether or not there is any start command (target position), in which if any, the control object is started. If it has reached the target position, the movement is stopped and the processing is terminated.

Next, the motor control processing will be described with reference to FIG. 22.

First, a determination is made whether or not the Z phase is detected, in which if NO, the processing is terminated, while if YES, the following processing is continued. The contents of registers are saved, and the current position information is fetched from the counter.

Next, the current loop is calculated. Then a determination is made whether the loop is a speed loop or a position loop, by seeing the value of the internal counter, and a respective calculation is performed. Next, it is examined whether or not there is any reference value, and then the next processing is performed by using the reference value if any, or generating it if not.

Next, the status is checked to count up in the internal counter, the saved values are restored to the registers and the processing is terminated.

The status check processing will be described with reference to FIG. 23.

First, a determination is made whether or not the stroke is over. This can be determined depending on whether or not the rotation angle of motor exceeds a limit in the positive or negative direction, which has been preset with a parameter, whereby if it exceeds the limit, the stroke is over, the flag for stroke over status is set, the stop instruction is set, the busy status is cleared, and the processing is terminated.

On the other hand, if the stroke is not over, a determination is made whether or not there is any object at the target position. If any, the inposition status indicating that the object is at the target position is set, while if not, the inposition status indicating that the object is at the target position is cleared.

Next, it is examined whether or not the position deviation is too large, in which if NO, a determination is made whether or not the object has reached the target position within a set time, and if not overtime, the processing is terminated. If the position deviation is too large or the inposition is overtime, a counter overflow status or an inposition overtime status is set, the stop instruction is set, the busy status is cleared, and the status check is terminated.

Figure 29:
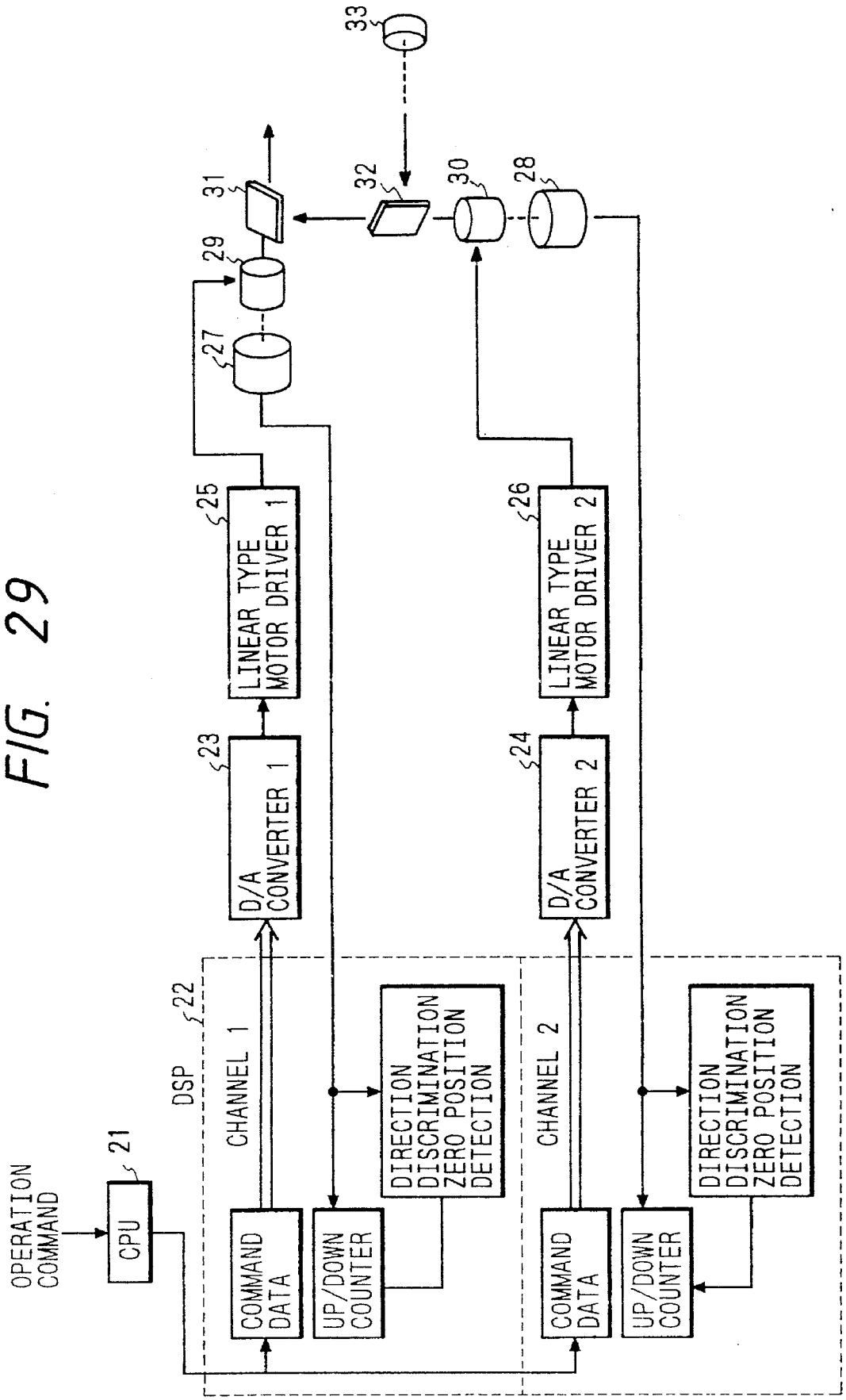
FIG. 29 is a block diagram in which the present invention is applied to a biaxial scanning device.

FIG. 29 is a diagram showing an example in which the configuration of the present invention is applied to a biaxial scanning apparatus. In the same figure, 33 is a projector device such as a semiconductor laser, 31, 32 are mirrors 1, 2, 29, 30 are brushless motors 1, 2, 27, 28 are incremental type rotary encoders 1, 2, 25, 26 are linear type motor drivers for driving the brushless motors, 22 is a digital signal processor DSP, 23, 24 are D/A converters for converting the output of the DSP into the analog signal, and 21 is a host CPU.

The laser beam projected from the semiconductor laser is scanned in two directions of X and Y axes, in which this system is adapted to move the laser beam to an arbitrary position desired by the user at a high speed and with an arbitrary trajectory.

As in the previous example, the user specifies the motion of each mirror 1, 2 to the host CPU. The host CPU commands the DSP to perform the operation necessary for the motion. The DSP determines the direction of motor rotation from the digital output signal of each incremental type rotary encoder 1, 2 which detects the rotation angle of each motor 1, 2, obtains the rotor of motor (current positional information of mirror) by counting up or down, calculates the movement amount from that information and target position information supplied from the host CPU, and supplies a command corresponding to the movement amount through the D/A converter and the linear type motor driver to each motor 1, 2. Here, the DSP must perform in time division the sampling of current positional information, the operation, and the output of command value to the D/A converter for controlling the motion of mirror 1, and for controlling the motion of mirror 2, alternately. Accordingly, the DSP requires a faster operation speed than the system which operates only one mirror. Also, to position two mirrors at high precision, the signal processing within the processor must be also performed at high precision. Accordingly, in this case, it is requisite to use the DSP capable of performing the digital operation at a high speed and with high precision.

Also, as in the previous example, for a highly accurate positioning, the brushless motor and the linear type motor driver are indispensable.

As above described, according to the present invention, it is possible to perform the positioning with high precision and at a high speed.

Because of the digital signal processing, the stable and extended control is allowed with the implementation of a complex algorithm.

What is claimed is:

1. A positioning device comprising:

an actuator, having a magnetic material portion to be temporarily magnetized by conduction of electricity, for abutting an object;

abutting means for causing said actuator to abut the object;

detecting means for detecting a movement position of said actuator;

conducting means for causing said magnetic material portion of said actuator to conduct electricity when said actuator is located within a predetermined range set by the detection of said detecting means to fix said actuator to the object; and write-in means for writing control information of the object on a medium when said actuator is fixed to the object.

2. The device according to claim 1, wherein said actuator is adapted to rotate and wherein said detecting means detects a rotation position of said actuator.

3. The device according to claim 1, wherein said detecting means comprises an encoder for discriminating a rotation state of a motor for driving said actuator.

4. The device according to claim 3, wherein said motor has a plurality of drive terminals.

5. A method for positioning a subject comprising the steps of:

moving an actuator having a magnetic material portion to be temporarily magnetized by conduction of electricity so as to abut the subject;

detecting a setting position of said actuator;

controlling a position of the subject by causing the magnetic material portion of said actuator to conduct electricity in accordance with the setting position detected in said detecting step to fix said actuator to the subject; and writing control information of the subject on a medium when said actuator is fixed to the subject.

6. The method according to claim 5, further comprising the step of driving an encoder for discriminating a rotation state of a motor for driving the actuator.

* * * * *